(12) United States Patent
Arai et al.

(10) Patent No.: US 6,302,543 B1
(45) Date of Patent: Oct. 16, 2001

(54) PROJECTOR

(75) Inventors: Jun Arai; Shogo Kurosawa; Motoyuki Fujimori; Akitoshi Kuroda; Shinji Haba; Kiyoshi Miyashita, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/077,092

(22) PCT Filed: Sep. 18, 1997

(86) PCT No.: PCT/JP97/03296

§ 371 Date: Jun. 15, 1998

§ 102(e) Date: Jun. 15, 1998

(87) PCT Pub. No.: WO98/12601

PCT Pub. Date: Mar. 26, 1998

(30) Foreign Application Priority Data

Sep. 19, 1996 (JP) .................................................... 8-248084
Oct. 28, 1996 (JP) .................................................... 8-285690

(51) Int. Cl.⁷ .................................................... G03B 21/14
(52) U.S. Cl. .............................. 353/70; 353/119; 248/157
(58) Field of Search .............................. 353/69, 70, 119; 248/393, 397, 157, 423, 188.2, 188.4, 188.8

(56) References Cited

U.S. PATENT DOCUMENTS

| | | | |
|---|---|---|---|
| 3,704,848 | * 12/1972 | Trebes et al. ...................... | 248/188.4 |
| 4,141,523 | * 2/1979 | Brendgens ........................... | 353/119 |
| 4,433,824 | * 2/1984 | Koosha .............................. | 248/188.4 |
| 5,292,095 | * 3/1994 | Cattaneo ........................... | 248/188.4 |
| 5,720,539 | * 2/1998 | Woo ........................................ | 353/69 |
| 5,788,355 | * 8/1998 | Na ...................................... | 353/101 |
| 5,836,556 | * 11/1998 | Kim ................................. | 248/188.4 |
| 5,895,110 | * 4/1999 | Okada et al. ......................... | 353/101 |
| 5,971,350 | * 10/1999 | McCutcheon ...................... | 248/188.2 |

FOREIGN PATENT DOCUMENTS

| | | |
|---|---|---|
| U-64-23037 | 2/1989 | (JP) . |
| A-1-302387 | 12/1989 | (JP) . |
| U-5-36439 | 5/1993 | (JP) . |
| A-5-135745 | 6/1993 | (JP) . |
| A-9-54370 | 2/1997 | (JP) . |
| WO96/20424 | 7/1996 | (WO) . |

* cited by examiner

Primary Examiner—William Dowling
(74) Attorney, Agent, or Firm—Oliff & Berridge, PLC

(57) ABSTRACT

A projector, which has a main body and a plurality of feet protruding from the main body to support the main body, includes a first adjuster that adjusts stepwise the amount of protrusion of at least one of the plurality of feet, and a second adjuster that infinitely and finely adjusts the amount of protrusion of at least one of the plurality of feet. The position of a projection image of the projector can be easily and speedily adjusted by coarsely adjusting the amount of protrusion of the foot by the first adjuster, and then making fine adjustment by the second adjuster.

27 Claims, 23 Drawing Sheets

PROJECTOR

BACKGROUND OF THE INVENTION

1. Field of Invention

The present invention relates to a projector that includes a main body having inside a projection optical system for forming an optical image corresponding to image information by optically processing a light beam emitted from a light source and projecting the magnified optical image onto a projection plane via a projection lens, and a plurality of feet protruding from the main body to support the main body.

2. Description of Related Art

There has been used a projector provided with a projection optical system for forming an optical image corresponding to image information by optically processing a light beam emitted from a light source and projecting the magnified optical image onto a projection plane via a projection lens. In such a projector, it is required to adjust the position of the image to be projected. The adjustment is generally made by changing the projection angle by tilting the projector body, or by changing the height of the projector body.

As a method of changing the inclination or height of the projector body, there is a suggestion of a method that uses the turn of a screw (screw method). That is, the height is adjusted by loosening and tightening the screw.

In this screw method, however, since the height is changed only by one pitch of a thread groove in one turn of the screw, a user is forced to turn the screw many turns to adjust the height to a particular height, which is considerably troublesome.

SUMMARY OF THE INVENTION

An object of the present invention is to provide a projector that has a projection optical system for forming an optical image corresponding to image information by optically processing a light beam emitted from a light source and projecting the magnified optical image onto a projection plane via a projection lens, and that also has a foot structure capable of achieving easy and speedy adjustment of the position of the image to be projected onto the projection plane (hereinafter referred to as the "projection image").

The present invention provides a projector having a main body, and a plurality of feet protruding from the main body to support the main body, wherein the projector including a first adjuster for adjusting stepwise the amount of protrusion of at least one of the plurality of feet, and a second adjuster for arbitrarily and finely adjusting the amount of protrusion of at least one of the plurality of feet.

According to the present invention, since the projector includes the first and second adjuster, the amount of protrusion of the foot of the projector can be coarsely adjusted by the first adjusters, and, precisely adjusted by the second adjuster, making it possible to easily and speedily adjust the position of the projection image of the projector.

In the above structure, it is preferable that the adjustment by the first adjuster be made by operating a lever. In particular, it is preferable that the operating direction of the lever be the same as the raising direction of the main body of the projector.

Through the operation of the lever, operability in foot adjustment of the projector is enhanced. Moreover, when the operating direction of the lever is the same as the raising direction of the main body of the projector, the main body of the projector can be raised while operating the lever. Accordingly, it is possible to adjust the amount of protrusion of the foot from the main body according to the height of the raised projector, and to thereby enhance operability in foot adjustment.

It is preferable that the aforesaid lever be located in a cutout portion formed on the boundary between the base and the side of the main body, and that the leading end of the lever protrude from the side of the main body.

When the lever protrudes from the side of the projector main body, operability is enhanced since the position of the lever can be known by feeling on the side of the main body, and therefore the user can adjust the foot through the operation of the lever while viewing the projection plane.

Furthermore, when a plurality of the first adjuster are provided at almost symmetrical positions with respect to the center of gravity of the projector, since the user is allowed to raise the projector straight, it is possible to avoid a phenomenon in which the feet are asymmetrical in length during adjustment.

One embodiment of the present invention provides a projector including a main body, and a plurality of feet protruding from the main body to support the main body, wherein at least one of the plurality of feet is a rod-like member supported slidably in the protruding direction with respect to the main body. The foot is provided with a first adjuster for adjusting stepwise the amount of protrusion of the foot and a second adjuster for arbitrarily and finely adjusting the amount of protrusion of at least one of the plurality of feet.

The first adjuster has a plurality of recesses formed on the outer peripheral surface of the foot, and a retainer formed in the main body to be engaged with any of the recesses.

The plurality of recesses formed on the outer peripheral surface of the rod-like foot are, in short, recesses that can regulate the sliding of the foot with engagement with the retainer and can adjust stepwise the amount of protrusion of the foot from the main body. For example, they may be a plurality of recesses formed like a rack along the extending direction of the foot, or a plurality of recesses formed over the entire outer periphery of the foot in the radial cross-section.

According to the present invention, since the amount of protrusion of the foot can be adjusted stepwise according to the pitch of the recesses, the adjustment to the foot can be speedily made.

Furthermore, it is preferable that the main body of the projector be provided with a lever for engaging and disengaging the retainer and the recess.

That is, since the retainer and the recess can be engaged and disengaged only by operating the lever, operability in adjusting the foot of the projector is further enhanced.

Still furthermore, it is preferable that the aforesaid retainer include a retaining piece turnably supported in the main body by a shaft pin to engage with the recess, an urging member for keeping the recess and the retaining piece engaged by urging, and a control portion for disengaging the recess from the retaining piece through the operation of the lever.

In short, the urging member can keep the recess and the retaining piece engaged by urging, and may be, for example, an urging member using the force of restitution, such as a spring, or an urging member using gravity.

Since the retainer includes the urging member the engagement between the recess and the retaining piece is firmly held as long as no external force is applied by the control portion, and the protrusion of the foot is stably maintained.

Moreover, since the aforesaid lever is operated only when disengaging the recess from the retaining piece, operability in adjusting the foot of the projector is remarkably enhanced.

Furthermore, it is preferable that the projector having the above structure further include a first regulator for restricting the foot from falling off the main body. In particular, it is preferable that the first regulator be provided on the foot where the first adjuster is provided.

Since the projector has the first regulator, when the amount of protrusion of the foot is adjusted stepwise by raising the projector body and simultaneously operating the lever, the foot does not fall off the main body, and handling of the projector is facilitated. When the foot is incorporated in the projector body, it does not fall off the main body, and assembly operability is thereby enhanced.

When the first regulator is provided on the foot where the first adjuster is provided, it is possible to prevent the foot from falling off the main body, regardless of assembly conditions of other components, which remarkably enhances assembly operability.

It is preferable that the foot with the above first adjuster be provided with a second adjuster that includes a thread groove formed along the extending direction of the foot, and a screw member having a thread portion to be in threaded engagement with the thread groove.

The thread groove formed in the foot generally includes a male thread groove formed on the outer periphery of the foot, or a female thread groove formed on the inner surface of a hole bored inside the foot along the extending direction thereof.

Therefore, the thread portion of the screw member is a male thread portion, a female thread portion, or the like that is formed depending on the form of the thread groove.

Since the foot with the first adjuster is also provided with the second adjuster, the amount of protrusion of the foot from the projector body can be finely adjusted to an arbitrary value by the second adjuster after the stepwise adjustment by the first adjuster. This makes it possible to speedily and precisely adjust the position of the projection image.

It is preferable that the above second regulator be provided with a second regulator means for restricting the screw member from falling off the foot.

The second regulator can restrict the screw member from falling off the foot by adjusting the amount of protrusion of the foot from the main body.

The second regulator prevents, coupled with the aforesaid first adjuster capable of stepwise adjustment, the user from making troublesome adjustment only with the second adjuster.

If the user relies on only the second adjuster there is a fear that the user will be forced to make troublesome adjustment without noticing the possibility of speedy adjustment by the first adjuster.

On the other hand, when the possible length to be adjusted by the second adjuster is regulated by the second regulator means so that it corresponds to one pitch of the aforesaid plurality of recesses, the user can notice earlier the limit of adjustment by the second adjuster and adjust the amount of protrusion of the foot by switching to the first adjuster. As a result speedy foot adjustment is not hindered.

In one embodiment the thread groove formed in the aforesaid screw receiving portion is a female thread groove formed on the inner surface of a hole extending from the leading end of the foot along the extending direction, and the aforesaid screw member is a rod-like member to be inserted into the screw receiving portion and is provided, on the outer peripheral surface, with an adjustment portion formed of a male thread portion to be in threaded engagement with the screw receiving portion attached to a leading end, it is preferable that the second regulator include an insertion portion consisting of a hole formed at the base end of the female thread groove with a diameter almost equal to the root diameter of the female thread groove, a guide portion provided of the adjustment portion, and guided into the insertion portion without threaded engagement with the screw receiving portion, and a regulating portion attached to a leading end; of the guide portion and guided into the insertion portion by threaded engagement between the adjustment and the screw receiving portion.

Since the second regulator has the guide portion and the regulating portion and these portions are guided into the insertion portion formed in the foot, when the adjustment portion and the screw receiving portion are removed from threaded engagement, the screw member is caused to idle by the guide portion, which allows the limit of adjustment by the second adjuster to be easily known.

Furthermore, since the regulating portion is attached to the leading end of the guide portion, the screw member is prevented from immediately falling off the foot during idling. Moreover, since the regulating portion can be in threaded engagement with the screwing receiving portion, it is possible to easily connect the screw member with the foot during assembly.

Still furthermore, it is preferable that the aforesaid screw member have a control portion for turning the screw member with respect to the foot, that the control portion is formed of a disk member larger than the cross section of the foot in plan view, and that the disk member be provided with a plurality of protrusions on the outer periphery thereof.

Since the screw member has such a control portion, fine adjustment can be easily made by the second adjuster and operability of the projector is thereby further enhanced.

An embodiment of the present invention also provides a projector including a main body, and a plurality of feet protruding from the main body to support the main body, wherein at least one of the plurality of feet is supported slidably with respect to the main body along the protruding direction and the main body is provided with an adjuster capable of fixing the foot at an arbitrary position.

Since the aforesaid foot is supported slidably with respect to the main body in the protruding direction and can be fixed at an arbitrary position by the adjuster, it is possible to freely set the amount of protrusion of the foot by releasing the adjuster, and to easily and speedily adjust the position of a projection image of the projector.

Specifically, it is preferable to adopt, as the above adjuster, an adjuster including a cylindrical foot case for covering the rod-like foot, a ring-shaped foot holder for gripping the foot inside the foot case inserted into the lower end of the foot case and provided with a tapered portion that decreases in diameter in the insertion direction, an urging member for urging the foot holder toward the direction of insertion into the foot case, and a release member for taking the foot holder out of the foot case and releasing the gripping state of the foot holder.

In such an adjuster, the foot can be fixed at an arbitrary position by the ring-shaped foot holder and the amount of protrusion of the foot from the projector body can be freely set by releasing the gripping state through the release member, which further enhances operability in foot adjustment in the projector.

BRIEF DESCRIPTION OF THE DRAWINGS

The foregoing and further objects, features and advantages of the present invention will be described in or apparent from the following description of preferred embodiments with reference to the accompanying drawings, wherein like numerals are used to represent like element and wherein.

DETAILED DESCRIPTION OF PREFERRED EMBODIMENTS

A first embodiment of the present invention will be described below with reference to the drawings.

Figure 1:
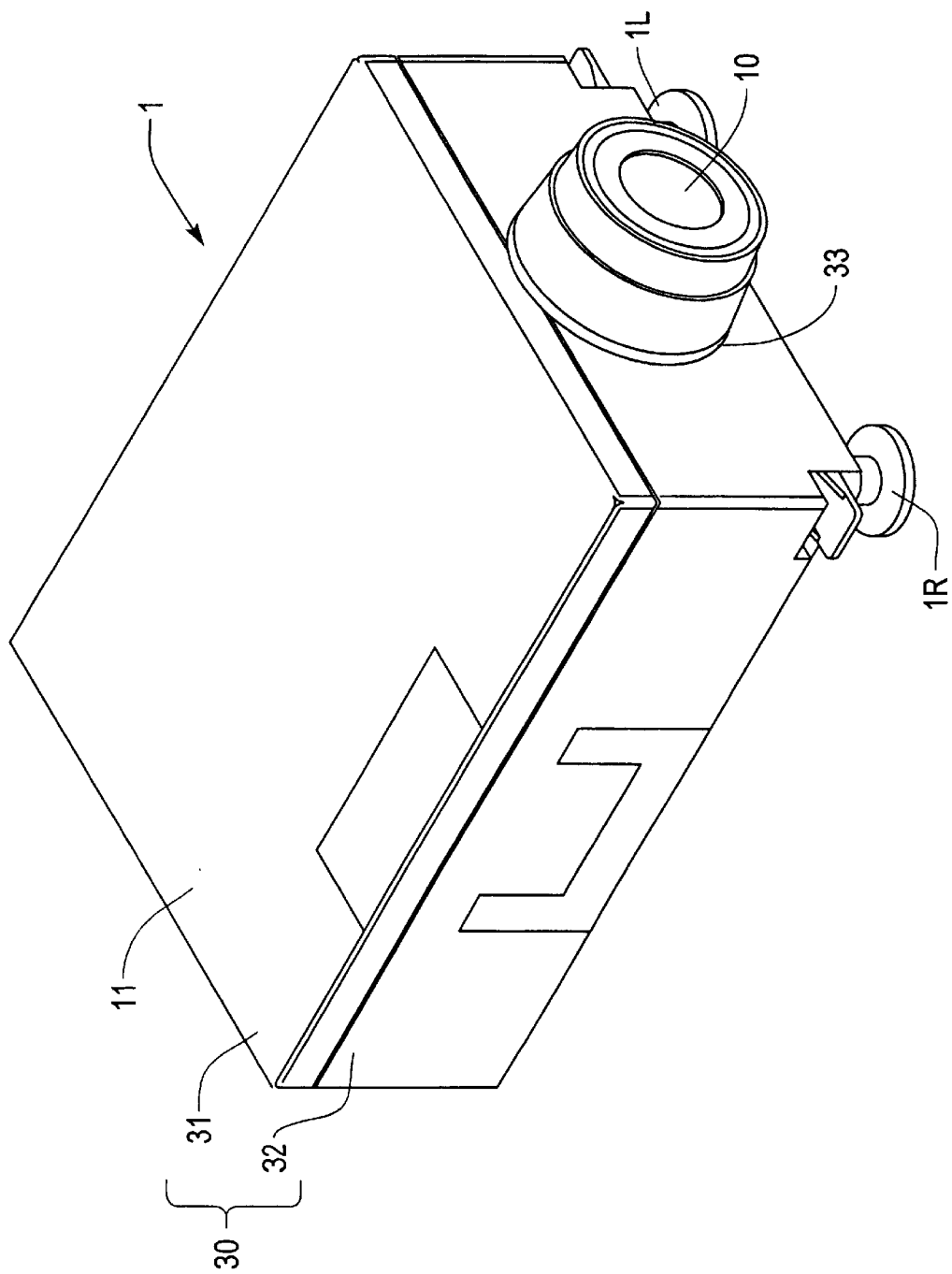
FIG. 1 is an outward perspective view of a projector according to a first embodiment of the present invention.
Figure 2:
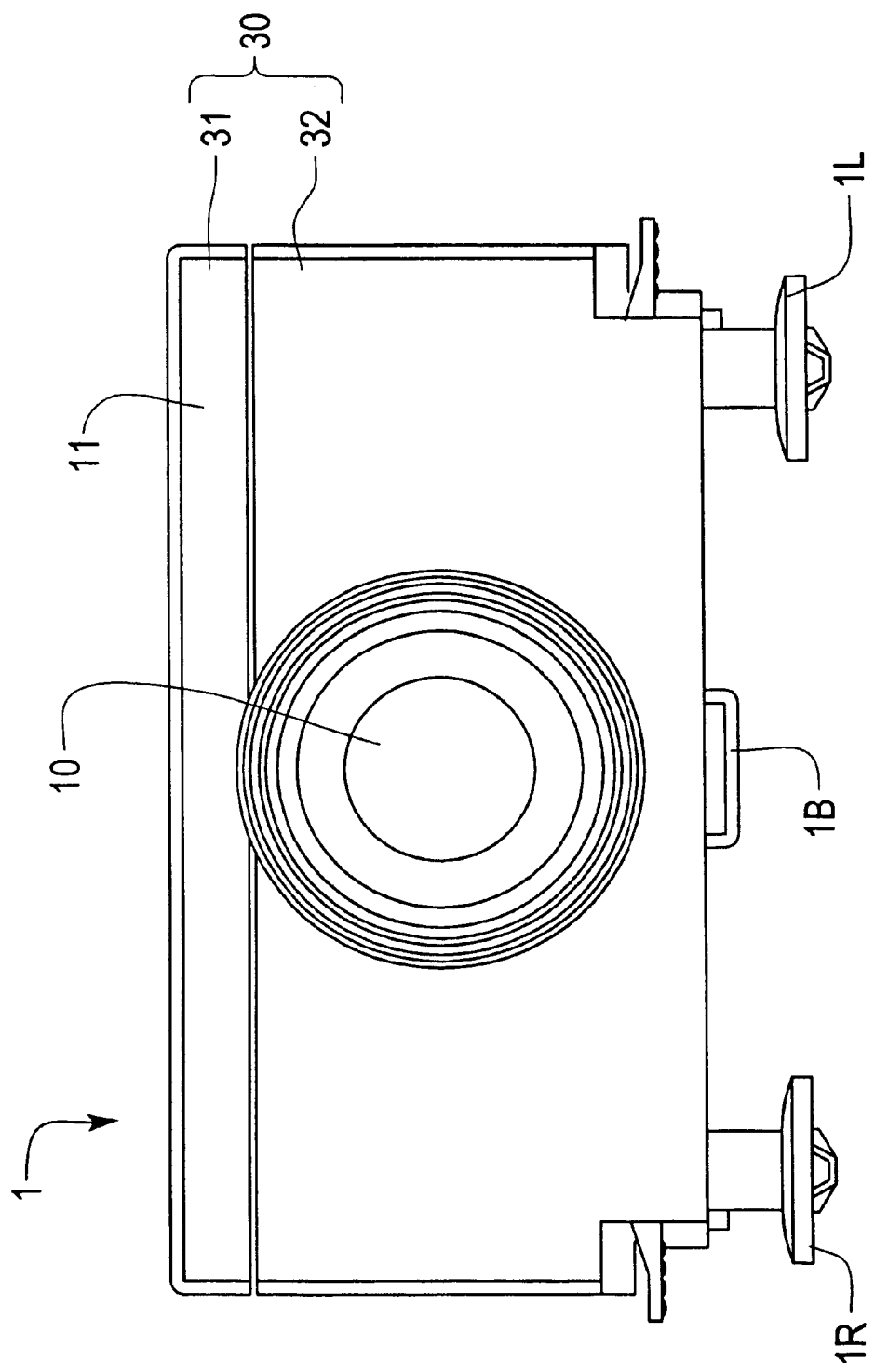
FIG. 2 is a front elevation of the projector of the above embodiment.
Figure 3:
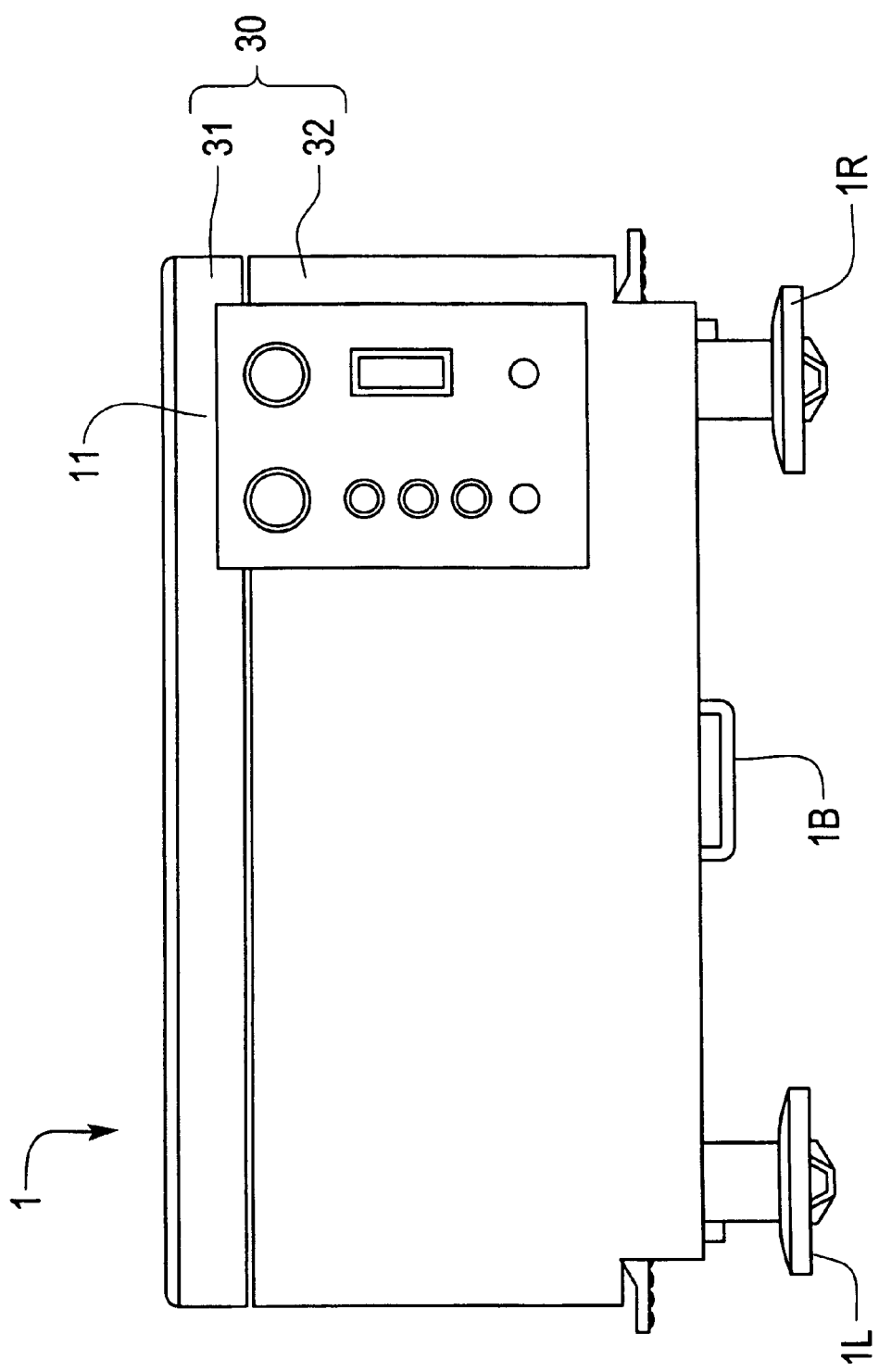
FIG. 3 is a rear elevation of the projector of the above embodiment.
Figure 4:
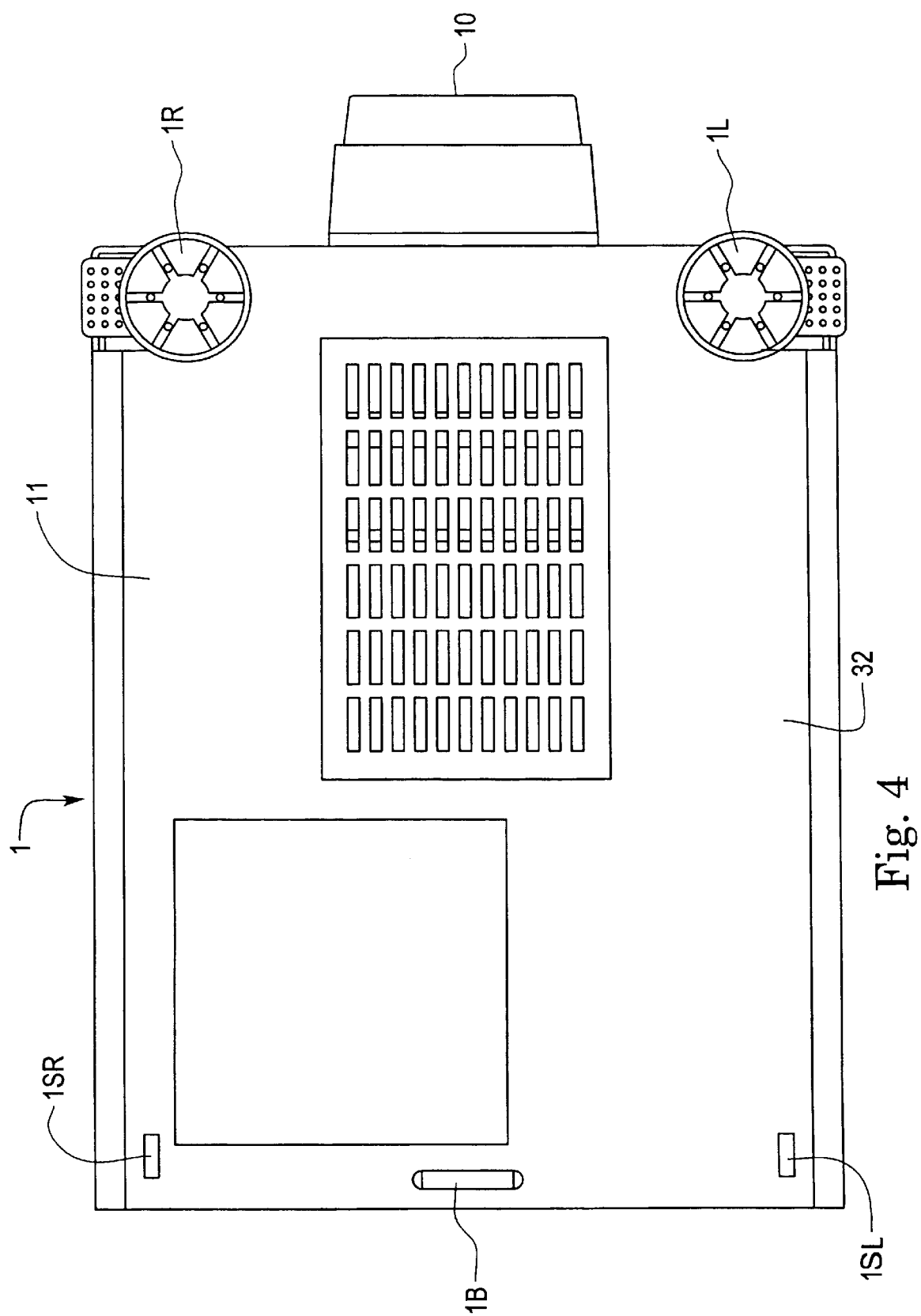
FIG. 4 is a bottom view of the projector of the above embodiment.
Figure 5:
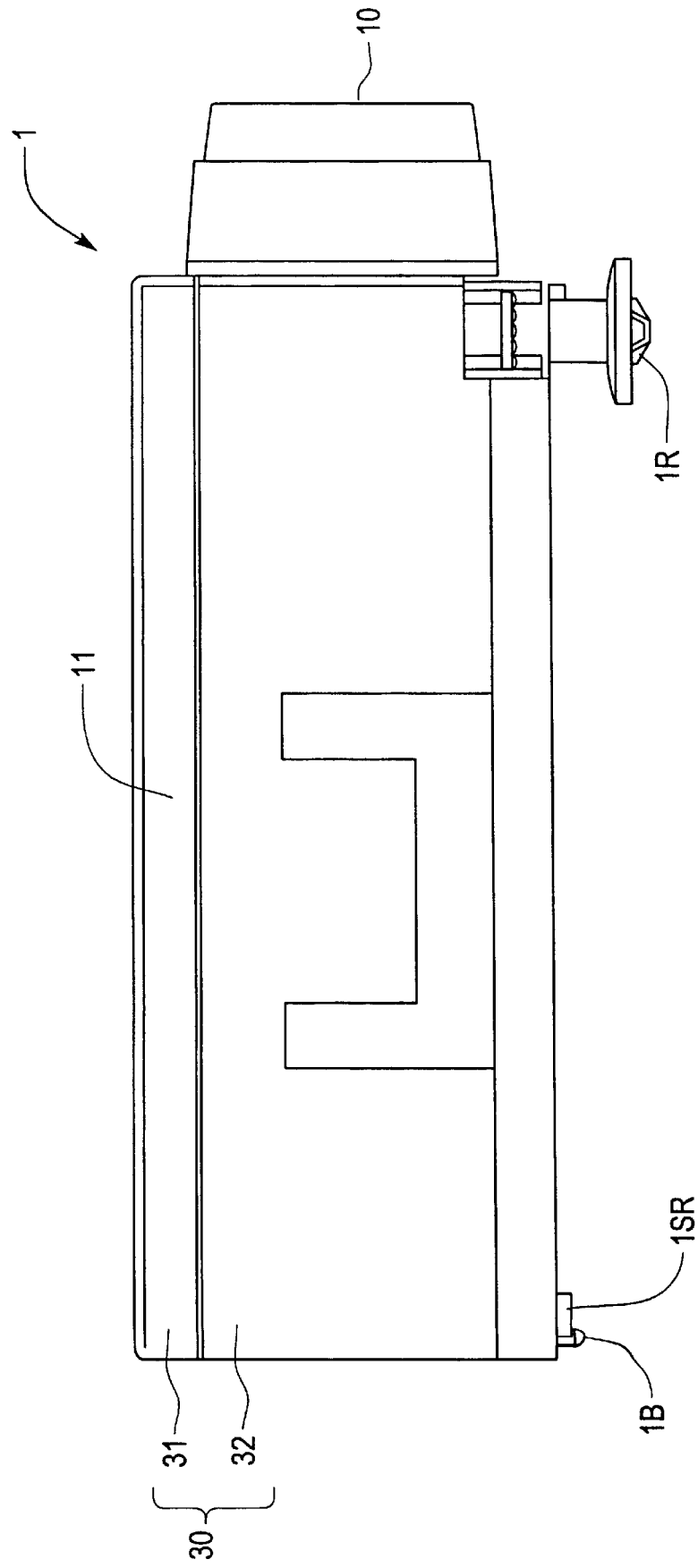
FIG. 5 is a side view of the projector of the above embodiment.

FIGS. 1 to 6 show a projector 1 according to a first embodiment of the present invention. FIG. 1 is an outward perspective view thereof, and FIGS. 2 to 6 are outward plan views, viewed from the front, the rear, the bottom, the side, and the top thereof, respectively.

The projector 1 has an outer casing 30 having an upper casing 31 and a lower casing 32.

The outer casing 30 also has an opening 33 at the center front thereof. A projection lens 10 is located to protrude from the opening 33, and an image is projected onto a projection plane by the projection lens 10.

Although not shown in FIGS. 1 to 6, a projection optical system including a light source, a light valve, and the like, a power unit for supplying the projection optical system with electric power, a drive circuit for controlling the drive of the projection optical system, and the like are housed inside the outer casing 30.

Underneath a main body 11 of the projector 1, as shown in FIGS. 1 to 6, a pair of feet 1R and 1L protrude on the front side, and a foot 1B protrudes on about the center rear side. Moreover, two supplementary feet 1SR and 1SL are located almost symmetrically with respect to the foot 1B on the rear side of the projector 1. These feet support the projector 1 on a stand.

The two supplementary feet 1SR and 1SL are provided for preventing both rear ends of the projector 1 from making direct contact with the setting plane.

In particular, when impact is applied to the right or left rear end of the projector 1, either the supplementary foot 1SR or 1SL first makes contact with the setting plane, and thereby lessens the impact.

Figure 7:
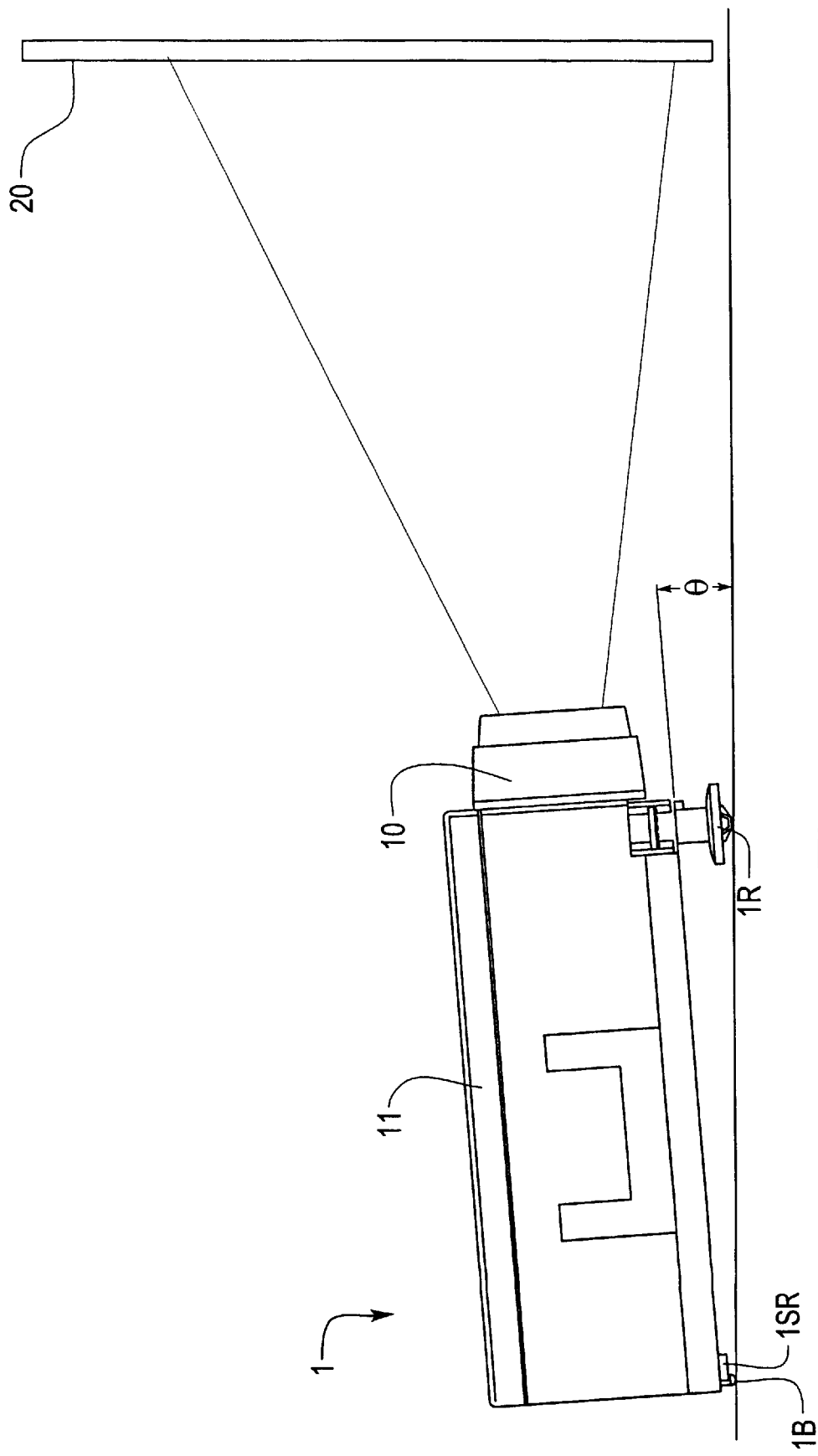
FIG. 7 is a side view showing the state in which an image is projected onto a screen by the projector of the above embodiment.

In using the projector 1 having these feet 1R, 1L, and 1B, an image projection angle θ is changed by adjusting the amounts of protrusion of the feet 1R and 1L from the main body 11, as shown in FIG. 7, thereby adjusting the position of projection on a screen 20.

That is, the position of a projection image moves up as the projection angle θ increases, and moves down as the projection angle θ decreases. Therefore, the projection image can be placed into a desired position on the screen 20 by adjusting this angle θ.

Figure 8A:
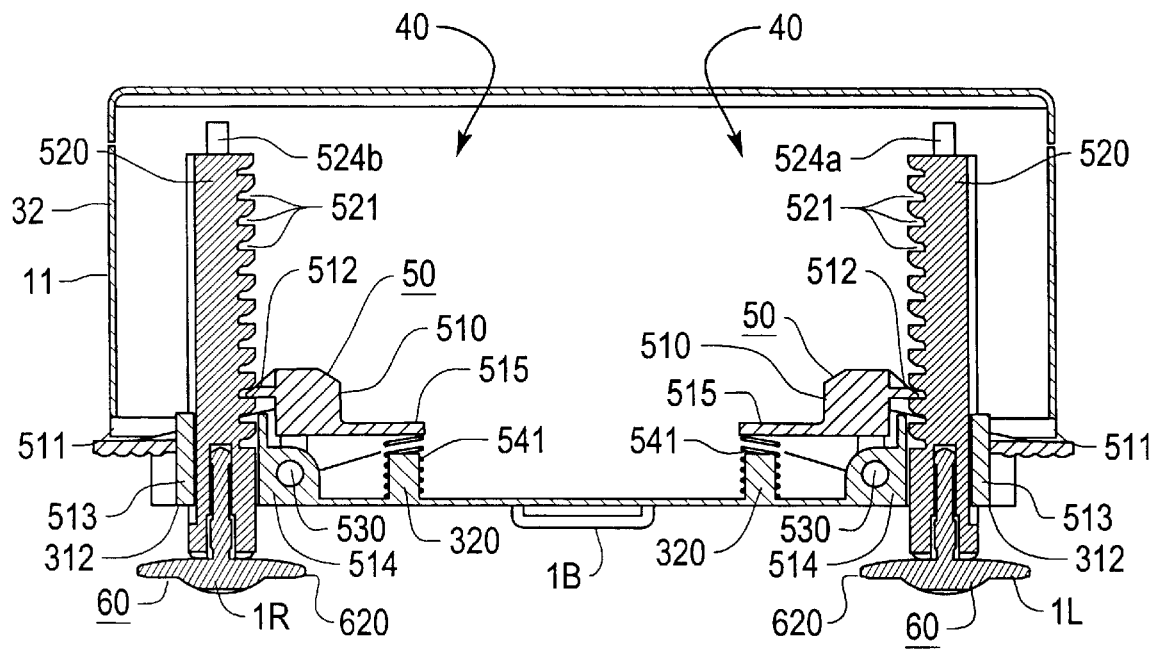
FIGS. 8(A) and 8(B) are vertical sectional views of foot adjustment mechanisms in the above embodiment.
Figure 8B:
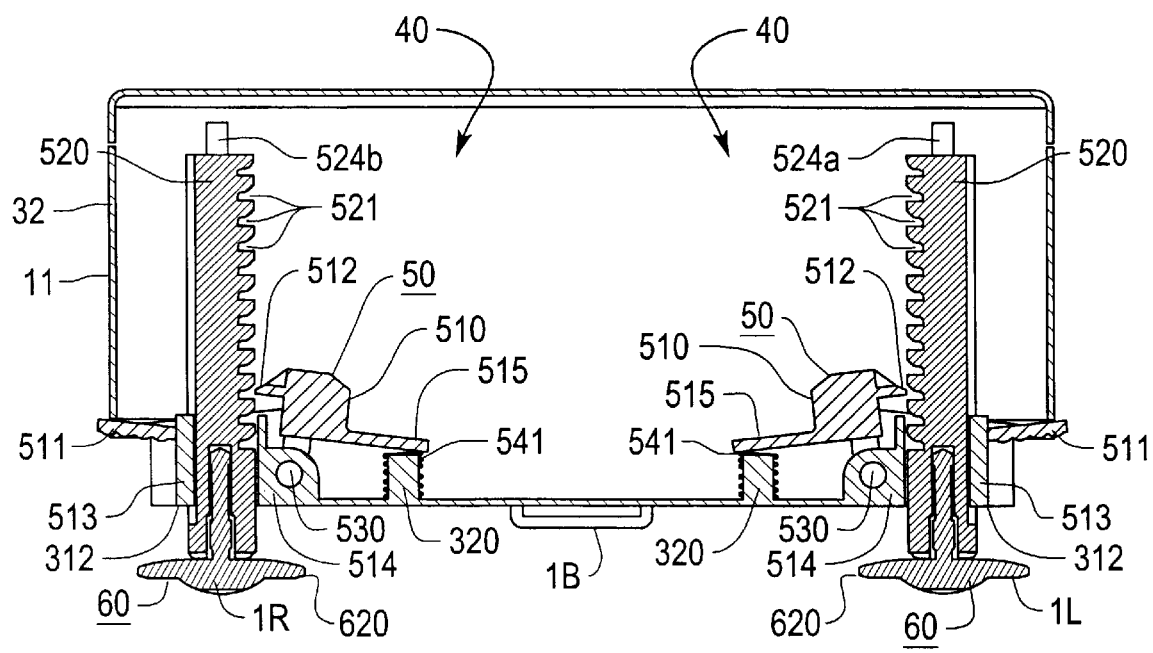

The amounts of protrusion of the feet 1R and 1L from the main body 11 are adjusted by adjustment mechanisms 40 shown in FIGS. 8(A) and 8(B) Each adjustment mechanism 40 includes a first adjuster 50 and a second adjuster 60.

The adjustment mechanism 40 for adjusting the amount of protrusion of the foot 1R and the adjustment mechanism 40 for the foot 1L are not structurally different from each other except that they are symmetric in structure.

Figure 6:
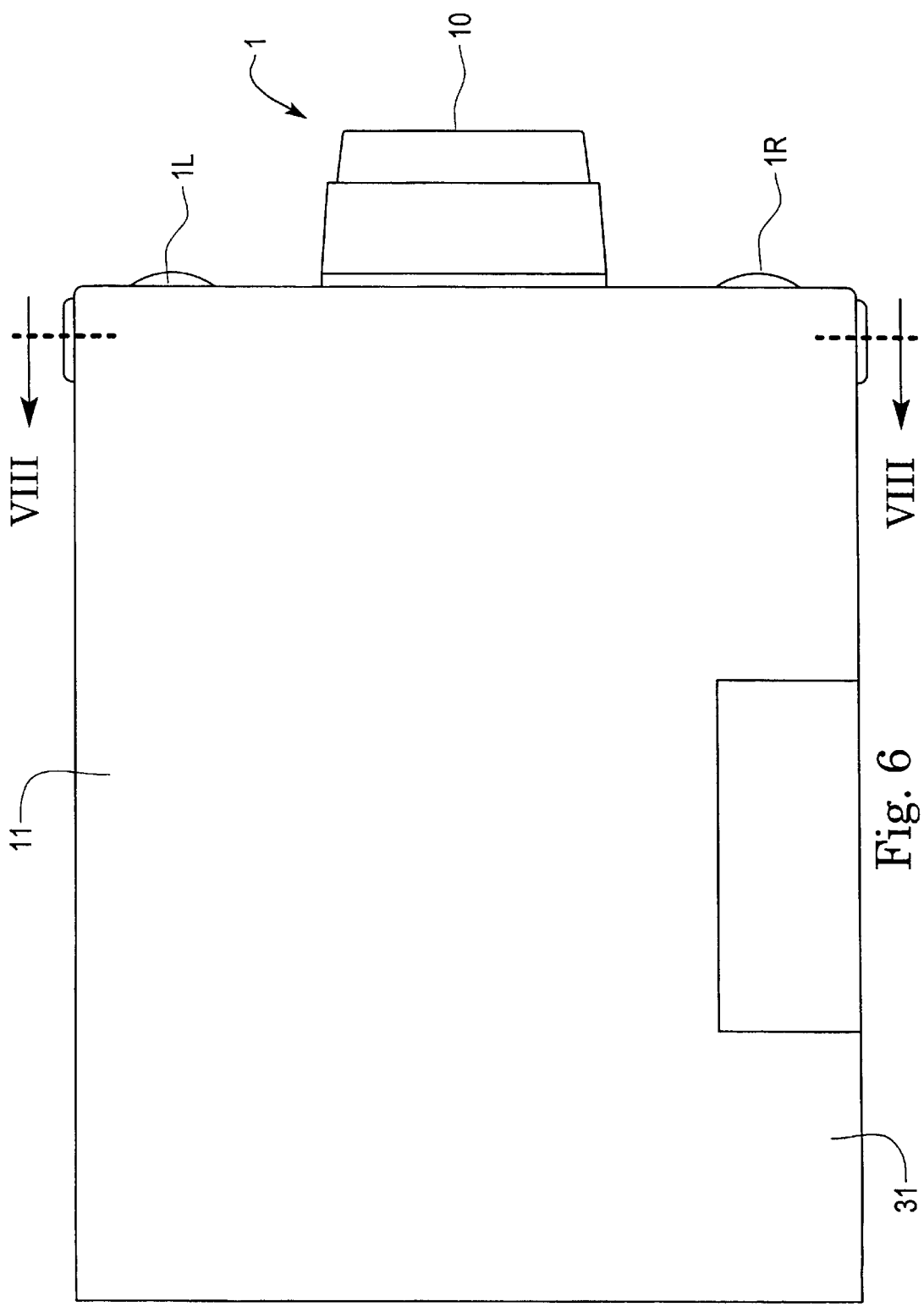
FIG. 6 is a top view of the projector of the above embodiment.
Figure 9:
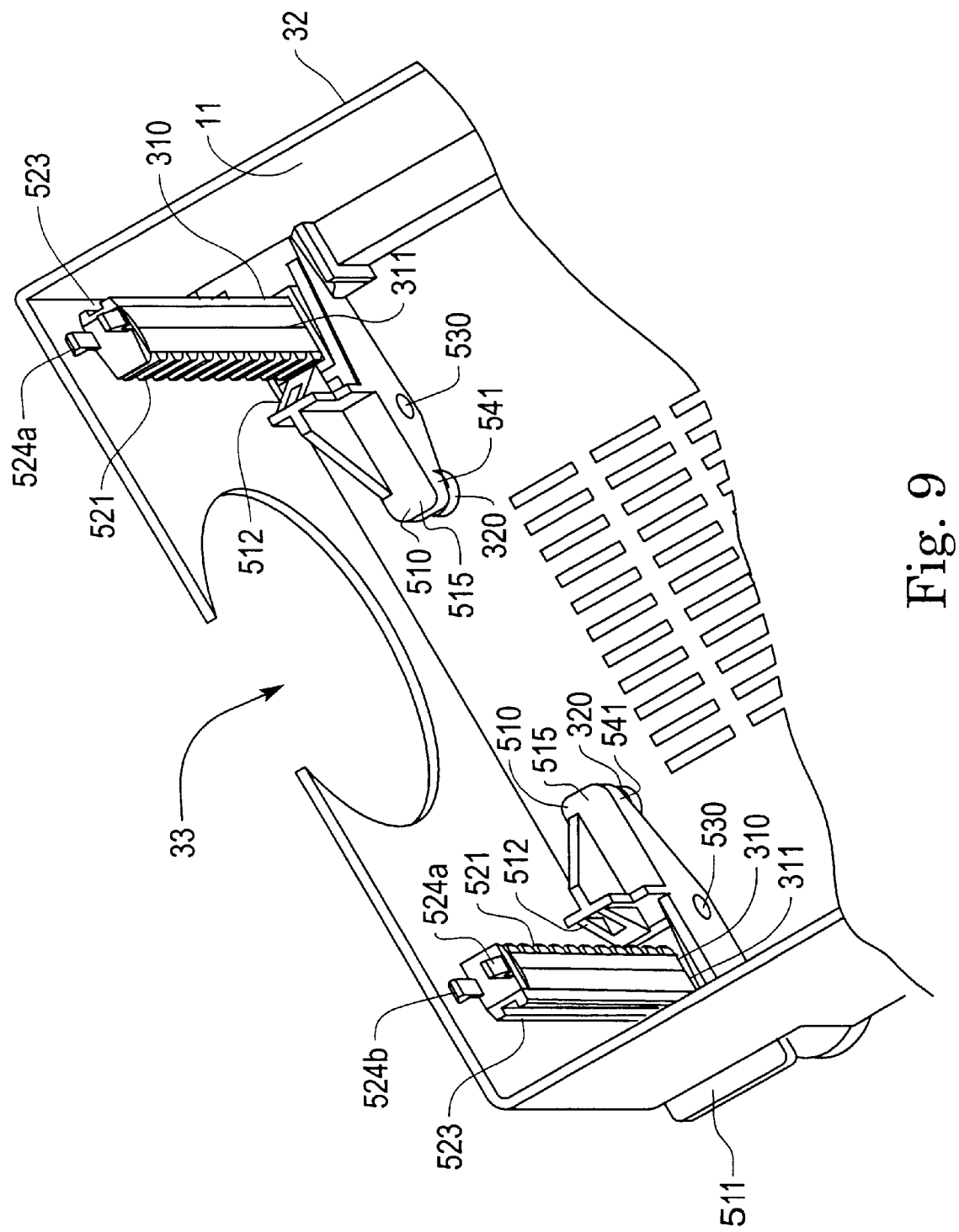
FIG. 9 is a partial perspective view showing the internal structure of the foot adjustment mechanisms in the above embodiment.

FIGS. 8(A) and 8(B) are cross-sectional views taken along line VIII—VIII in FIG. 6, and FIG. 9 is a perspective view showing the structure of the adjustment mechanisms 40 in the first embodiment.

The first adjuster 50 includes a rod-like foot section 520 supported slidably in the direction to of extension from the main body 11, a plurality of rack-like recesses 521 successively formed in the extending direction on the outer periphery of the foot section 520, and a retainer 510 mounted on the main body 11 to be engaged with any of these recesses 521.

The retainer 510 includes a retaining piece 512 for retaining the foot section 520 in engagement with the recess 521, a control section 511 for releasing the engagement between the retaining piece 512 and the recess 521, and a coil spring 541 located on the opposite side to the control section 511 to keep the engagement between the retaining piece 512 and the recess 521 by urging.

The control section 511 and the retaining piece 512 are integrally formed, and supported by a shaft pin 530 so that they can turn with respect to a bearing section 514 formed on the inner side of the lower casing 32 constituting the main body 11.

An insertion hole 513 is formed between the control section 511 and the retaining piece 512 in the retaining means 510, through which the aforesaid foot section 520 is inserted.

As shown in FIGS. 8(A), 8(B) and 9, guide portions 310 for guiding the sliding of the foot sections 520 in the direction of to extension from the main body 11, and spring support shafts 320 for positioning the coil springs 541 are formed on the inner side of the lower casing 32 of the projector 1. Each coil spring 541 is placed so that it surrounds the spring support shaft 320, and a fulcrum portion 515 of the retainer 510 is positioned on the coil spring 541.

Figure 10:
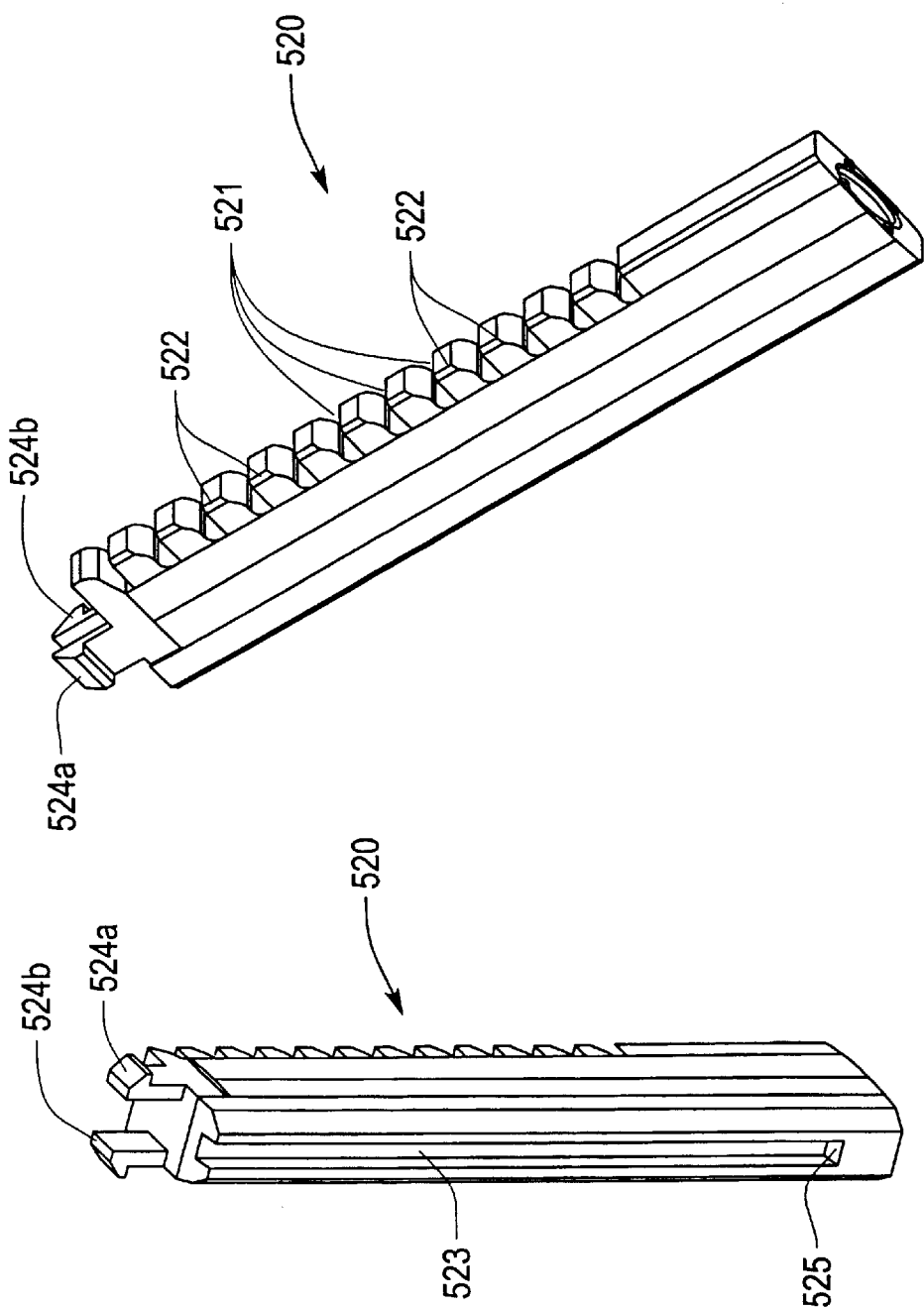
FIG. 10 is a schematic perspective view showing the structure of a foot section in the above embodiment.

The foot section 520 is, as shown in FIG. 10, composed of a plurality of recesses 521, and protrusions 522 which are formed with a predetermined pitch in the form of a rack. The protrusions 522 are each partly chamfered for smooth engagement of the retaining piece 512 of the retainer 510.

The stepwise adjustment is made coarser by increasing the pitch of the recesses 521, and the adjustment accuracy is heightened by decreasing the pitch of the recesses 521.

On the other hand, as shown in FIGS. 9 and 10, a guide receiving portion 523 for receiving a guide portion 310 formed on the inner side of the lower casing 32 of the projector 1 is formed at the position opposite to the recesses 521 and the protrusions 522, and is provided, at the upper end thereof, with a pair of claws 524a and 524b that serve as a first regulator.

Figure 11:
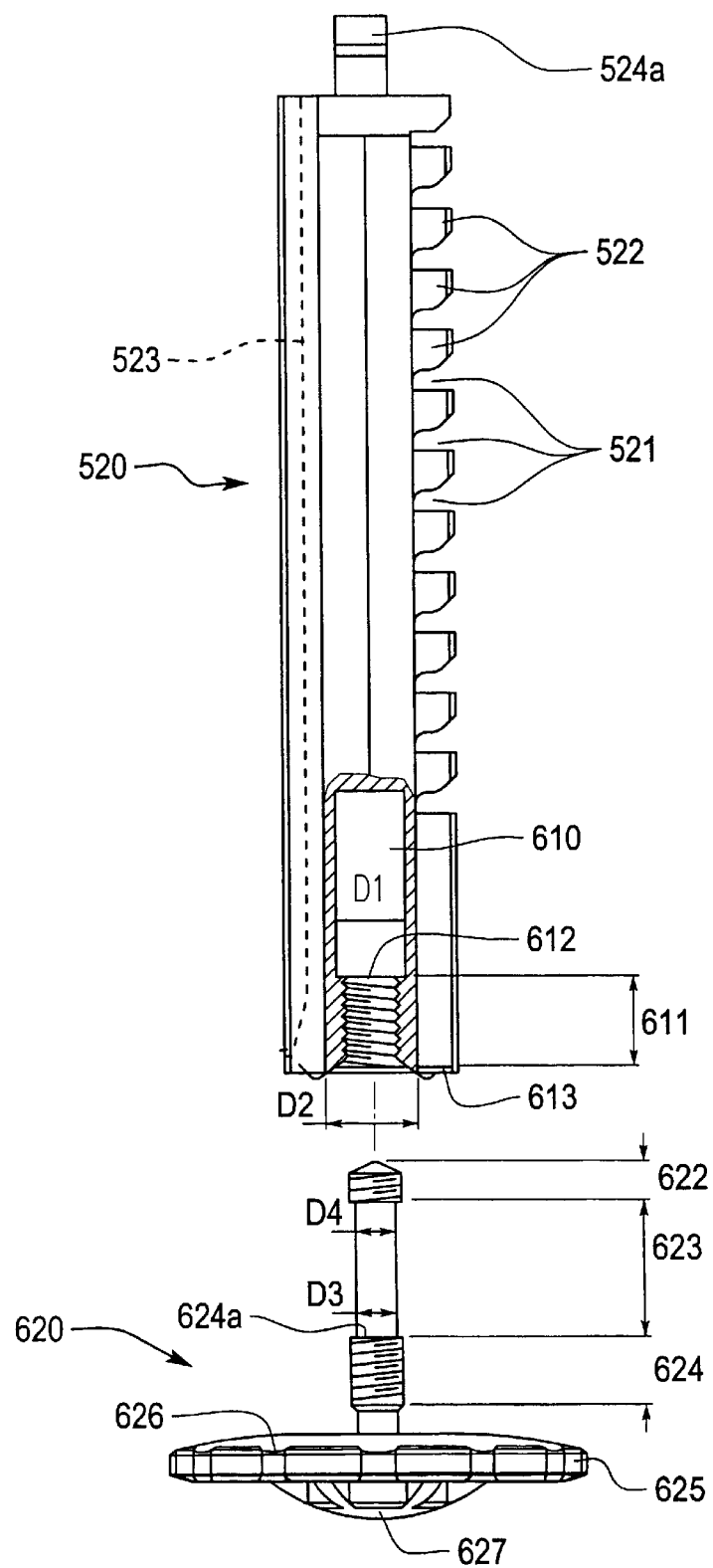
FIG. 11 is a side view showing the structure of a second adjuster in the above embodiment.

The second adjuster 60, as shown in FIG. 11, includes a screw receiving portion 611 having a thread groove that is formed along the extending direction from the leading end 613 of the foot section 520, and a screw member 620 having a screw portion to be brought into threaded engagement with the thread groove of the screw receiving portion 611.

The screw receiving portion 611 is a female thread groove formed on the inner side of a hole bored in the foot section 520 along the extending direction from the leading end 613 of the foot section 520 section 520. At the base end of the screw receiving portion 611 opposite to the protrusion direction of the foot, an insertion portion 610 is formed along the extending direction of the screw receiving portion 611.

The insertion portion 610 has a bore diameter D1 that is almost equal to the root diameter of the female thread groove of the screw receiving portion 611, that is, a distance D2 between opposing roots of the female thread groove.

Accordingly, when the male screw member in threaded engagement with the screw receiving portion 611 is passed through the screw receiving portion 611 and guided to the insertion portion 610, it is allowed to slide inside the insertion portion 610. The sliding is regulated by an upper end portion 612 of the screw receiving portion 611.

The screw member 620 is a rod-like member to be inserted into the aforesaid screw receiving portion 611, and is provided with an adjustment portion 624 having a male thread portion that is formed on the outer peripheral surface thereof to be in threaded engagement with the female thread groove of the screw receiving portion 611 .

When it is assumed that the forward end in the direction of insertion of the screw member 620 into the screw receiving portion 611 is taken as the leading end, a guide portion 623 is formed on the leading end of the adjustment portion 624, and a regulating portion 622 is further formed on the leading end of the guide portion 623. On the base side of the adjustment portion 624, a disk-like control portion 625 is provided.

The guide portion 623 is a rod-like member having a sectional diameter D4 that is smaller than a root diameter D3 of the male thread portion of the adjustment portion 624, and is to be guided to the insertion portion 610 without threaded engagement with the screw receiving portion 611.

The regulating portion 622 is provided with a male thread portion similar to that of the adjustment portion 624 on the outer peripheral surface thereof, and this male thread portion is separated from the male thread portion of the adjustment portion 624 by the guide portion 623.

The control portion 625 is a disk-like member located at the base end of the screw member 620 and projecting outward in the radial direction of the adjustment portion 624, and is provided with a spherical portion 627 on the lower surface thereof. The spherical portion 627 serves as a ground plane of the foot section 520 in setting the projector 1. Moreover, the control section 625 is provided with a plurality of protrusions 626 formed along the outer periphery of the disk.

The assembly procedure for mounting the aforesaid first and second adjuster 50 and 60 in the main body 11 of the projector 1 will be described below.

First, the coil spring 541 is placed so that it surrounds the spring support shaft 320 shown in FIGS. 8(A) and 8(B) and the retainer 510 is mounted so that the fulcrum portion 515 lies thereon.

Then, the center point of the turn of the retainer 510 is fixed by the shaft pin 530.

On the other hand, as shown in FIG. 11, the screw member 620 is inserted into the screw receiving portion 611 and the insertion portion 610 located in the lower part of the foot section 520, thereby forming a combination member of the foot section 520 and the screw member 620.

The procedure for inserting the screw member 620 into the screw receiving portion 611 will now be described. First, the regulating portion 622 is screwed into the screw receiving portion 611 while rotating the control portion 625. Then, the screw member 620 is inserted straight until the regulating portion 622 passes through the screw receiving portion 611 and the adjustment portion 624 reaches the screw receiving portion 611. After reaching the screw receiving portion 611, the adjustment portion 624 is screwed into the screw receiving portion 611 while further rotating the control portion 625, whereby the combination member of the foot section 520 and the screw member 620 is completed.

When the screw member 620 is inserted until the regulating portion 622 passes through the screw receiving portion 611, since the regulating portion 622 is caught on the upper end portion 612 of the screw receiving portion 611, the screw member 620 is prevented from falling off from the foot section 520.

Therefore, in forming the combination member, it is not always necessary to insert the adjustment portion 624 in the screw receiving portion 611, and to bring the adjustment portion 624 into complete threaded engagement with the screw receiving portion 611.

It is, however, preferable that the adjustment portion 624 be inserted in the screw receiving portion 611 to some extent. This is because assembly can be performed more smoothly without being disturbed by the loose screw member 620.

Next, as shown in FIG. 8(B), the retaining piece 512 and the recess 521 of the foot section 520 are disengaged by pushing the control portion 511 of the retaining means 510 upward, while the combination member is inserted into the guide portion 310 from the bottom side of the main body 11 of the projector 1.

The coefficient of friction and clearance between the foot section 520 and the guide portion 310 are appropriately set at such values that the foot section 520 can fall down by its own weight.

Furthermore, as shown in FIGS. 9 and 10, the foot section 520 is provided with the pair of claws 524a and 524b at the leading end thereof so that it does not fall off the main body 11. The combination member is inserted into the guide portion 310 while clamping and bending the pair of claws 524a and 524b in the sectional direction of the foot section 520.

After the combination member is pushed up until the claws 524a and 524b reach an upper end portion 311 of the guide portion 310, the clamping force for bending the pair of claws 524a and 524b is released. Then, the claws 524a and 524b are returned into their initial state and caught on the upper end portion 311 of the guide portion 310, thereby functioning as the first regulator for regulating the fall of the foot section 520 from the main body 11.

Although the guide receiving portion 523 of the foot section 520 is formed like a groove, as shown in FIG. 10, this groove is formed only part way on the foot section 520. Therefore, even if the foot section 520 is excessively inserted, since an end portion 525 of this groove makes contact with a lower end portion 312 (see FIGS. 8(A) and 8(B)) of the guide portion 310 and reaches the limit of insertion, the foot section 520 is prevented from being entirely put inside the outer casing 30.

In this way, the pair of claws 524a and 524b formed on the foot section 520 and the end portion 525 of the guide receiving portion 523 in the foot section 520 function as movement control members for limiting the sliding of the foot section 520 with respect to the main body 11 within a predetermined range.

Once the foot section 520 is inserted in the main body 11 of the projector 1, it cannot be removed from the outside of the projector 1.

When it is necessary to intentionally take out the foot section 520 for repair, exchange, or the like, however, the foot section 520 can be easily taken out by bending the pair of claws 524a and 524b inside the projector 1.

While the combination member of the foot section 520 and the screw member 620 is formed and then inserted from the bottom side of the projector 1, the screw member 620 may be inserted into the screw receiving portion 611, which is formed at the leading end of the foot section 520 in the protrusion direction, after inserting only the foot section 520.

The procedure for adjusting a projection image formed by the projector 1 having the aforesaid first and second adjuster 50 and 60 will be described below with reference to FIGS. 8(A) and 8(B).

FIG. 8(A) shows a state in which the foot section 520 is locked by the retaining piece 512, and FIG. 8(B) shows a state in which the lock is released and the foot section 520 is movable up and down.

When the control portion 511 of the retainer 510 is first pushed up while raising the projector 1, since the retainer 510 is turnable about the shaft pin 530, the coil spring 541 is pushed down, and the retainer 512 and the recess 521 are disengaged, as shown in FIG. 8(B).

When the retaining piece 512 and the recess 521 are disengaged, since the projector 1 is being raised, the foot section 520 protrudes by its own weight from the underside of the main body 11 along the guide portion 310.

If the amount of protrusion of the foot section 520 is too much, it can be adjusted by pushing the main body 11 downward while pressing the control section 511.

It should be noticed that the lengths of the feet 1R and 1L can be reduced for storing the projector 1 in the same operation.

After it is verified that the projection image fits in a fixed range on the screen 20 as shown in FIG. 7, the finger is taken off the control portion 511, so that the amounts of protrusion of the feet 1R and 1L are determined.

In this way, the foot section 520 is moved up and down and placed into some position, the retaining piece 512 and the recess 521 of the foot section 520 are engaged, whereby the lengths of the feet 1R and 1L are adjusted step by step in accordance with the pitch of the recesses 521.

In regard to the spring constant of the coil spring 541, since the load imposed on the retaining piece 512 by the coil spring 541 is set lighter than the weight of the projector 1, the retaining piece 512 and the recess 521 can be easily disengaged only by raising the control portion 511 with the finger. In the state in which the finger is off the control portion 511, the disengagement of the retaining piece 512 from the recess 521 can not be performed.

If it is further necessary to finely adjust the position of the projection image after the amounts of protrusion of the feet 1R and 1L of the projector 1 are adjusted stepwise by the first adjuster 50, or if the projector 1 rattles owing to unevenness of the setting plane, the amounts of protrusion of the feet 1R and 1L are finely adjusted by using the second adjuster 60.

The fine adjustment by the second adjuster mechanism 60 is made by changing the state of threaded engagement between the female thread formed in the screw receiving portion 611 and the male thread formed on the adjustment portion 624, as shown in FIG. 11.

That is, when the control portion 625 is turned in the screw tightening direction, the screw member 620 is inserted into the screw receiving portion 611.

On the other hand, when the control portion 625 is turned in the screw loosening direction, the screw member 620 is extended downward out of the screw receiving portion 611.

This function acts between the adjustment portion 624 of the screw member 620 and the screw receiving portion 611 formed in the foot section 520.

Therefore, the upward movement of the screw member 620 is regulated by the contact of the control portion 625 with a leading end 613 of the screw receiving portion 611.

On the other hand, when the control portion 625 continues to be turned in the screw loosening direction, the adjustment portion 624 is gradually extended out of the screw receiving portion 611.

Since the guide portion 623 is longer than the screw receiving portion 611, even if the control portion 625 is further turned in the screw loosening direction in this state, it continues to idle.

That is, the adjustment of the amount of protrusion of the foot 1R or 1L by the screw member 620 is enabled between the state where the control portion 625 is in contact with the leading end 613 of the foot section 520 and the state where a leading portion 624a of the adjustment position 624 opposite to the leading end in the protrusion direction is in contact with the leading end 613 of the foot section 520 in the protrusion direction.

The above-mentioned first embodiment has the following advantages.

Since the projector 1 has the adjustment mechanisms 40 for adjusting the position of a projection image, each of which includes the first adjuster 50 for stepwise adjustment and the second adjuster 60 for fine adjustment, it is possible to easily and speedily adjust the position of the projection image.

Furthermore, since the control portion 511 of the first adjuster 50 and the control portion, 625 of the second adjuster 60 are formed so that they are easily perceived by touch, the vertical position of the projector 1 can be adjusted while viewing the projection image, which provides a considerably high operability.

Still furthermore, since the amount of protrusion of the foot section 520 is regulated by the contact between the upper end portion 311 of the guide portion 310 and the pair of claws 524a and 524b, the foot section 520 does not fall off the main body 11 even if the projector 1 is raised excessively.

Still furthermore, in the first embodiment, the control portion 511 is positioned so that the finger is put thereon in raising the projector 1, and the direction in which the control portion 511 is pushed is the same as the direction in which the projector 1 is raised. As a result, the amount of protrusion of the foot 1R or 1L of the projector 1 can be efficiently adjusted.

Since a small part of the control portion 511 protrudes from the side of the outer casing 30 of the projector 1, the user can easily locate and operate the control portion 511 while viewing the projection plane.

That is, with the first adjuster 50, it is possible to adjust the vertical position of the projector 1 while viewing the projection image, which provides a considerably high operability.

Furthermore, the projection image can be placed into a desired position by raising or pushing down the projector 1 while pressing the control portion 511. Accordingly, the control portion 511 is released when the projection image approaches the desired position, and then, the fulcrum portion 515 of the control portion 511 is pushed up by the coil spring 541. The retaining piece 512 and any recess 521 can be thereby kept engaged with each other while being urged, and the projection image of the projector 1 can be held at a desired height.

Still furthermore, since the protrusions 522 of the foot section 520 are partly chamfered and the retaining piece 512 is also partly chamfered, engagement and disengagement between the retaining piece 512 and the recess 521 can be smoothly performed.

Since the foot section 520 and the retainer 510 are made of resin, it is possible to reduce the weight of the projector 1. If these members are made of metal, metal powder is produced owing to fretting of the foot section 520 and the retaining means 510. When they are made of synthetic resin or the like, however, it is inexpensive to minutely finish the surfaces thereof, and therefore, such a problem does not arise.

In addition, since the feet 1R and 1L are placed in almost symmetrical positions with respect to the center of gravity of the projector 1, the user can raise the projector 1 straight in adjusting the position of the projection image through the use of the first adjuster 50, which makes it possible to prevent the lengths of the right and left feet 1R and 1L of the projector 1 from being unequal to each other.

The control portion 625 is provided with the protrusions 626 (see FIG. 11) on the outer periphery thereof for easy operation, and also provided with the spherical portion 627 to be in contact with the setting plane.

Accordingly, the user can easily notice the screw member 620 while viewing the projection image. Moreover, since friction between the control portion 625 and the setting plane is small, the screw member 620 can be easily turned through the use of the control portion 625.

The friction between the control portion 625 and the setting plane can be further reduced by making the control portion 625 of a material having a considerably low coefficient of friction, such as resin.

Next, a projector according to a second embodiment of the present invention will be described. In the following, a description of components that are equivalent or similar to the aforesaid components or members is simplified or omitted.

Figure 12A:
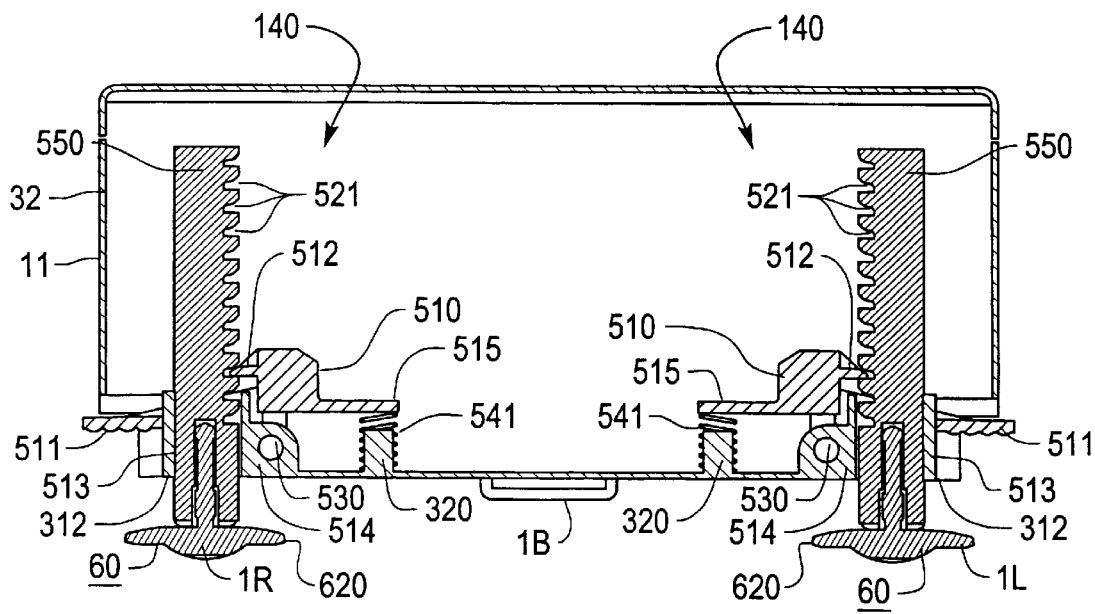
FIGS. 12(A) and 12(B) cross-sectional views of adjustment mechanisms in a projector according to a second embodiment of the present invention, which corresponds to FIG. 8.
Figure 12B:
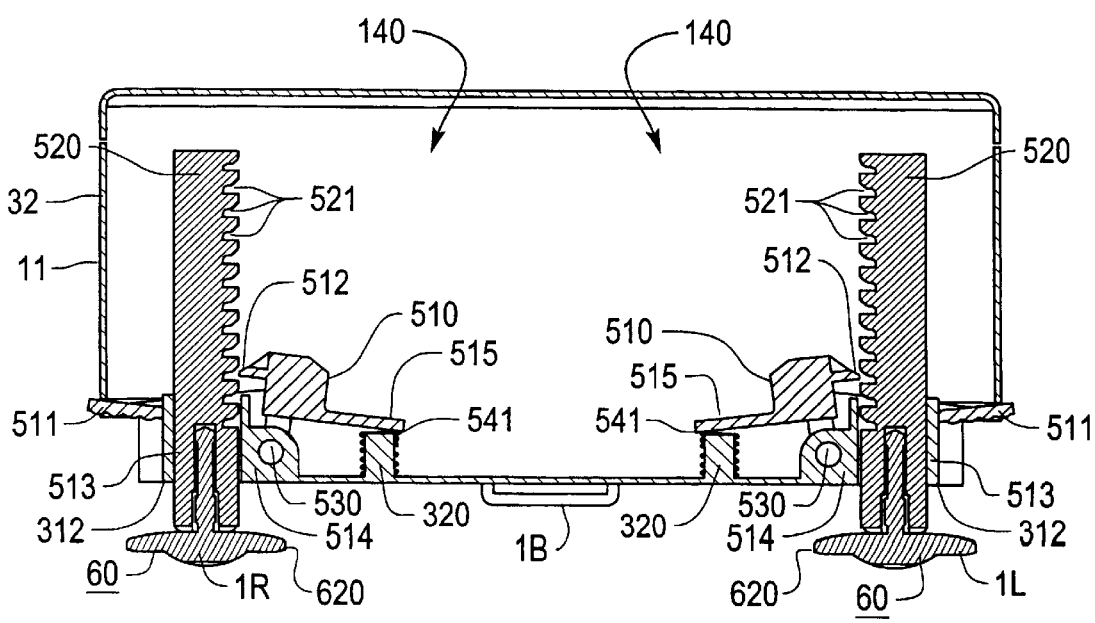
Figure 13:
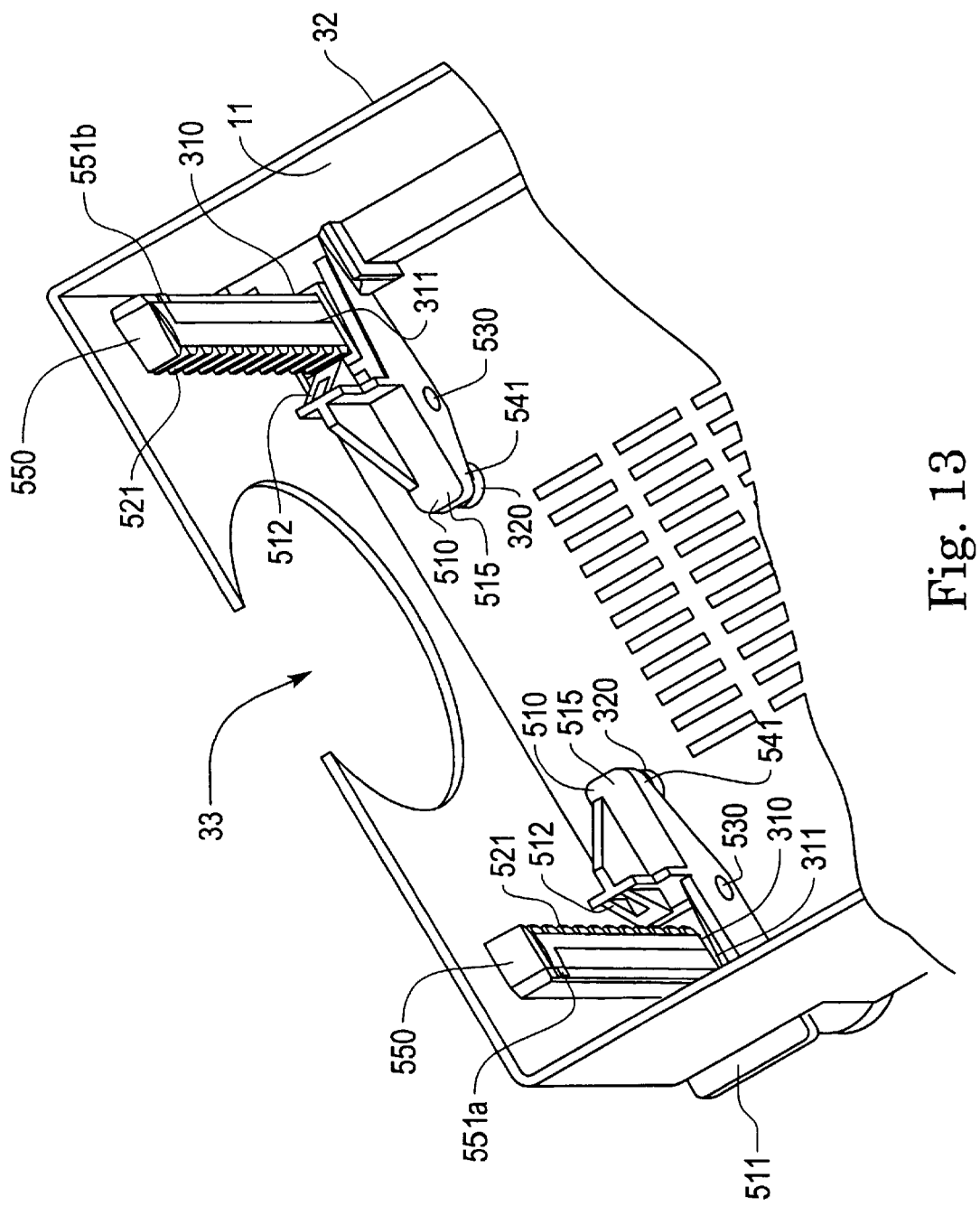
FIG. 13 is a partial perspective view of the adjustment mechanisms in the projector according to the second embodiment of the present invention, which corresponds to FIG. 9.
Figure 14:
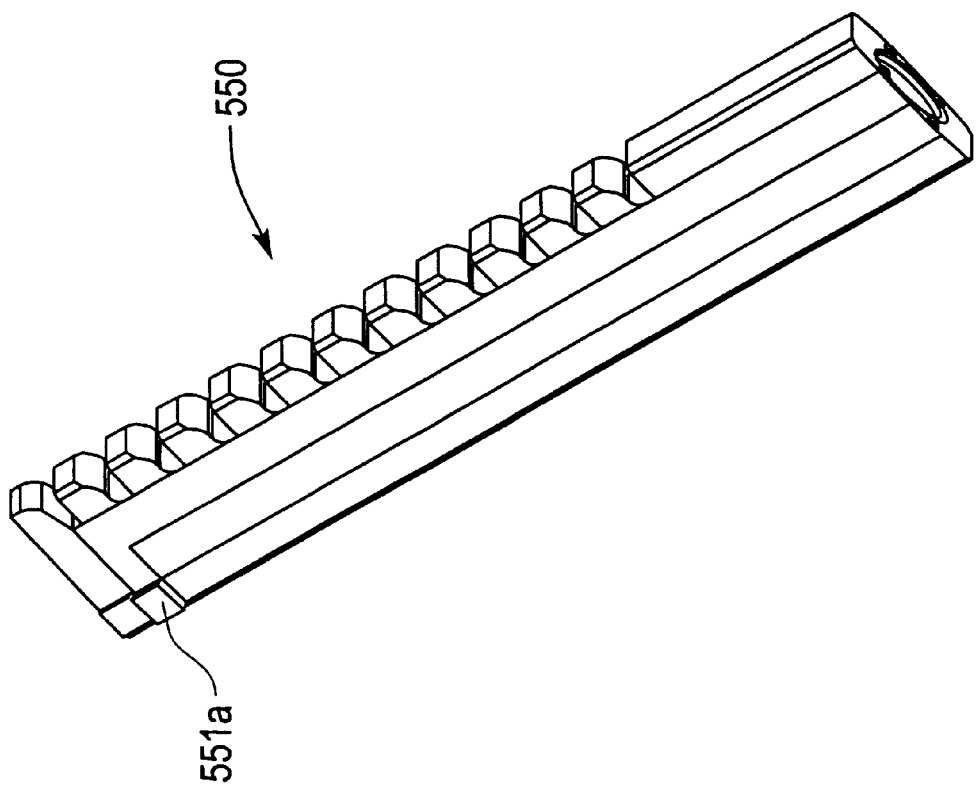
FIG. 14 is a schematic perspective view of the adjustment mechanism in the projector according to the second embodiment of the present invention, which corresponds to FIG. 10.
Figure 14:
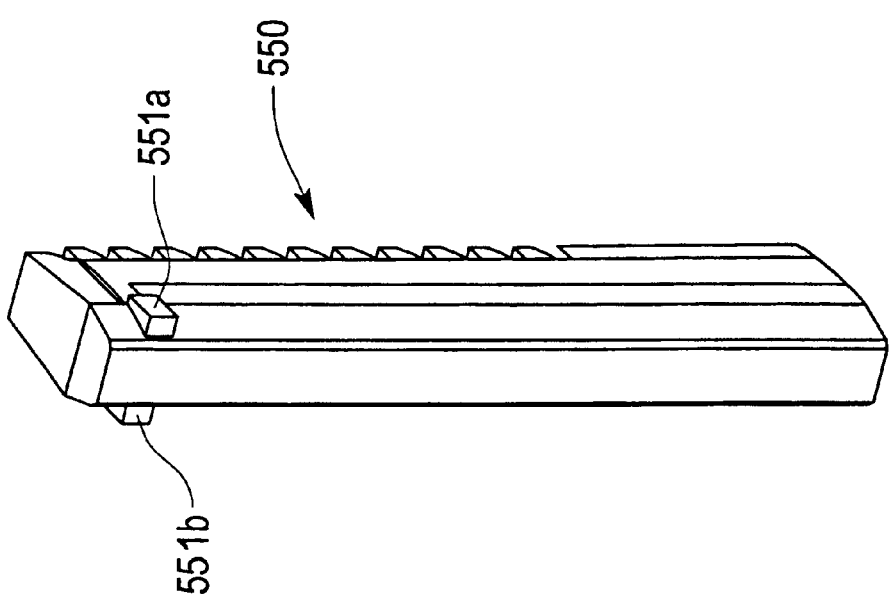
Figure 15:
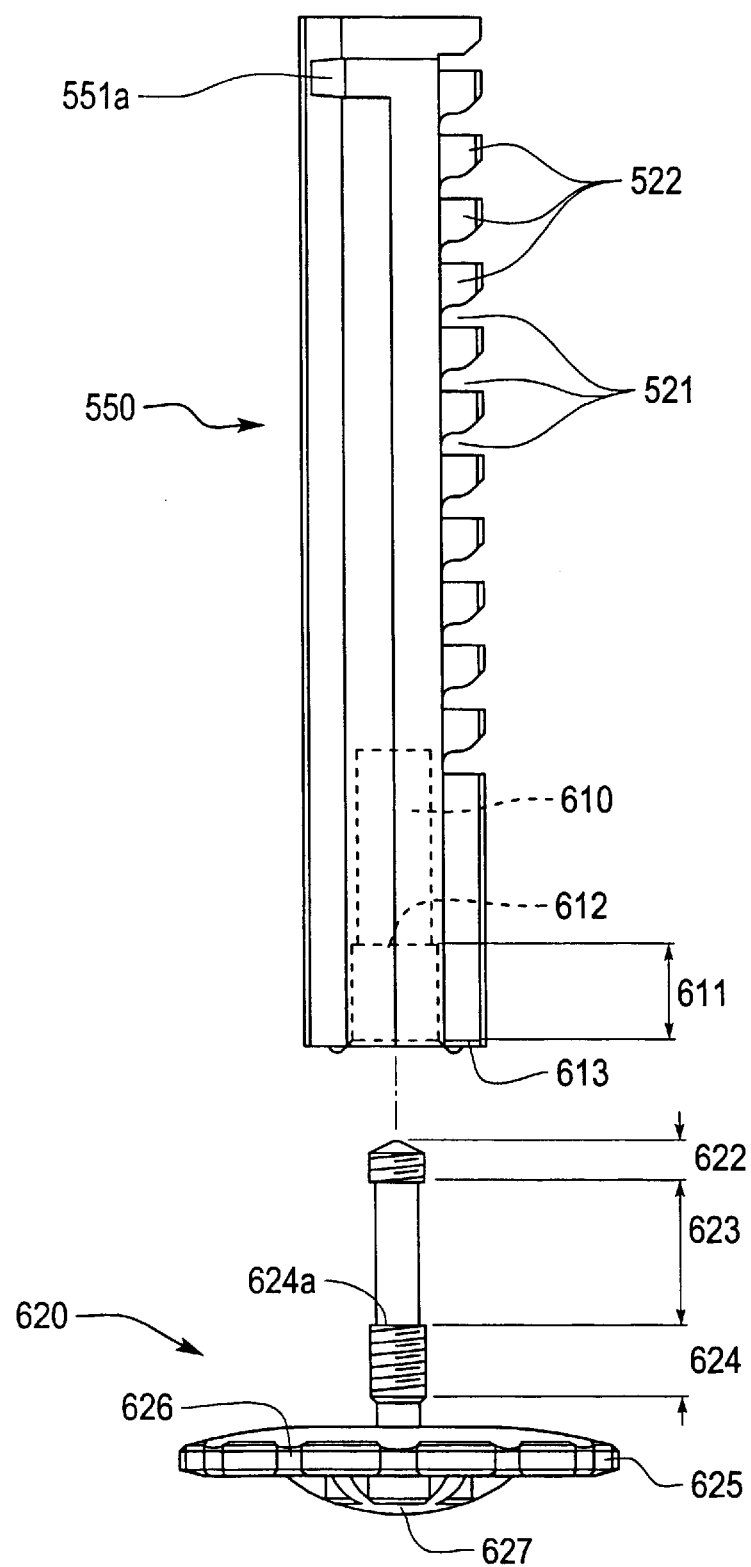
FIG. 15 is a side view of the adjustment mechanism in the projector according to the second embodiment of the present invention, which corresponds to FIG. 11.

FIGS. 12(A) to 15 show adjustment mechanisms 140 according to the second embodiment. FIGS. 12(A) and 12(B) are cross-sectional views corresponding to FIGS. 8(A) and 8(B) in the first embodiment, FIG. 13 is a schematic perspective view corresponding to FIG. 9 in the first embodiment, FIG. 14 is a schematic perspective view corresponding to FIG. 10 in the first embodiment, and FIG. 15 is a side view corresponding to FIG. 11 in the first embodiment.

In the adjustment mechanism 40 of the first embodiment, a pair of claws 524a and 524b (see FIG. 10) serving as the first regulator are formed at the upper end of the foot section 520, and the foot section 520 is inserted in the guide portion 310 while bending the claws 524a and 524b inward in the sectional direction of the foot section 520.

The adjustment mechanism 140 of the second embodiment is different from the aforesaid adjustment mechanism 40 in that a pair of claws 551a and 551b serving as a first regulator are formed on the sides of a foot section 550, as shown in FIG. 14, and that the guide receiving portion 523 formed in the foot section 520 of the first embodiment is not formed.

Therefore, the lower limit of the adjustment range of protrusion amount of the foot section 550 is defined by the contact of the lower end of the foot section 550 with a control portion 625 of a screw member 620.

The structure and the like of other components in the adjustment mechanism 140 of the second embodiment are not different from those of the aforesaid adjustment mechanism 40 of the first embodiment. Accordingly, components in FIGS. 12(A) to 15 that are common to those in FIGS. 8(A) to 11 are denoted by the same numerals as those in FIGS. 8(A) to 11, and a detailed description thereof is omitted.

The adjustment mechanism 140 of the second embodiment is assembled in almost the same procedure as for the adjustment mechanism 40 of the aforesaid first embodiment. Since the positions of the pair of claws 551a and 551b serving as the first regulator formed on the foot section 550 are different as mentioned above, however, the process of inserting the foot section 550 in a main body 11 is different from that of the first embodiment.

In the adjustment mechanism 40 of the first embodiment, the foot section 520 is mounted in the guide portion 310 of the main body 11 after the foot section 520 and a screw member 620 constituting a second adjuster 60 are combined.

On the other hand, in the adjustment mechanism 140 of the second embodiment, the pair of claws 551a and 551b cannot be bent in the sectional direction of the foot section 550.

Therefore, the foot section 550 is first inserted in a guide portion 310 from above a lower casing 32 shown in FIG. 13, and then, the screw member 620 is screwed into a screw receiving portion 611 in the foot section 550, thereby mounting the foot section 550 in the main body 11.

If the screw member 620 has an external form that is smaller than the inner diameter of the guide portion 310, it may be inserted in the guide portion 310 after being brought into threaded engagement with the foot section 550.

Since other assembly and adjustment processes are similar to those of the adjustment mechanism 40 according to the first embodiment, a description thereof is omitted.

The above-mentioned adjustment mechanism 140 of the second embodiment has the following advantages besides the aforesaid advantages of the first embodiment.

Since the pair of claws 551a and 551b serving as the first regulator are formed to protrude from the sides of the foot section 550, it is possible to easily form the first regulator on the foot section 550.

Furthermore, since the foot section 550 has no guide receiving portion, it can be slid upward until making contact with a control section 625 of the screw member 620.

In order to regulate the upward movement direction of the foot section 550, a device for regulating the upward movement of the foot section 550 may be provided on the inner side of the outer casing 30 of the projector 1. For example, a stopper for regulating the upward movement of the foot section 550 may be provided at such a position inside of an upper casing 31 that it makes contact with the upper end of the foot section 550.

Next, a projector according to a third embodiment of the present invention will be described.

In the aforesaid adjustment mechanism 40 of the first embodiment, the retaining piece 512 and the recess 521 are urged by the coil spring 541 shown in FIG. 8.

Figure 16:
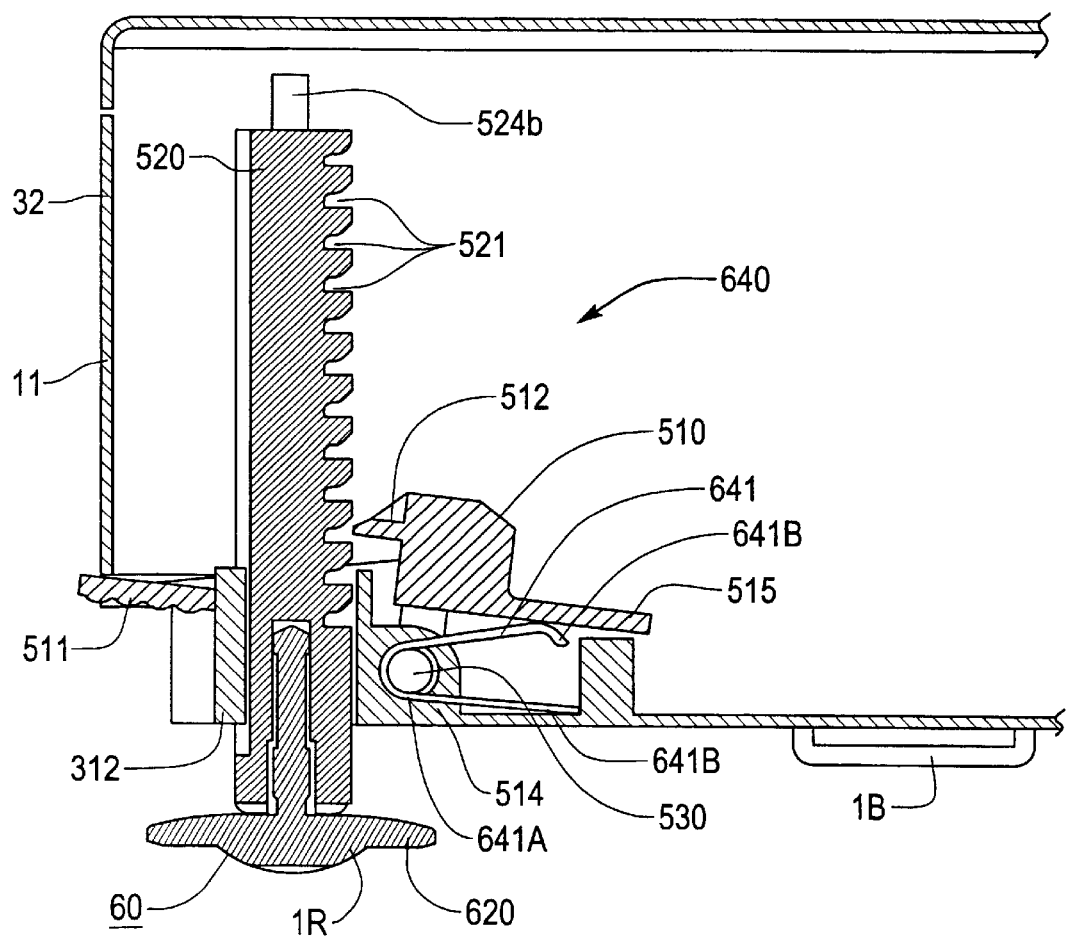
FIG. 16 is a vertical sectional view of an adjustment mechanism in a projector according to a third embodiment of the present invention.

An adjustment mechanism 640 of the third embodiment is different in that a torsion coil spring 641 composed of a spring body 641A and a rod portion 641B protruding from the spring body 641A is adopted as an urging member, as shown in FIG. 16. In this torsion coil spring 641, the coil spring portion is fitted on a shaft pin 530 that turnably supports a retaining piece 512.

Since other components are similar to those in the first embodiment, common components are denoted by the same numerals as those used in FIGS. 8 to 11, and a detailed description thereof is omitted.

Such an adjustment mechanism 640 of the third embodiment has the following advantages besides the aforesaid advantages of the first embodiment.

Since the torsion coil spring 641 is fixed on a main body 11 by the shaft pin 530, it is unnecessary to separately form the spring support shaft 320 for positioning the coil spring 541 inside the main body 11 as in the first embodiment, which simplifies the structure of an outer casing.

Furthermore, since the torsion coil spring 641 is adopted as the urging member, the urging force can be adjusted as needed by changing the position where the rod portion 641B and the retaining piece 512 make contact with each other.

Next, a projector according to a fourth embodiment of the present invention will be described.

In the adjustment mechanism 40 of the first embodiment, the adjustment mechanism 140 of the second embodiment, and the adjustment mechanism 640 of the third embodiment that are mentioned above, the retaining piece 512 and the recess 521 are kept engaged by being urged by the coil spring 541 and the torsion coil spring 641.

Figure 17:
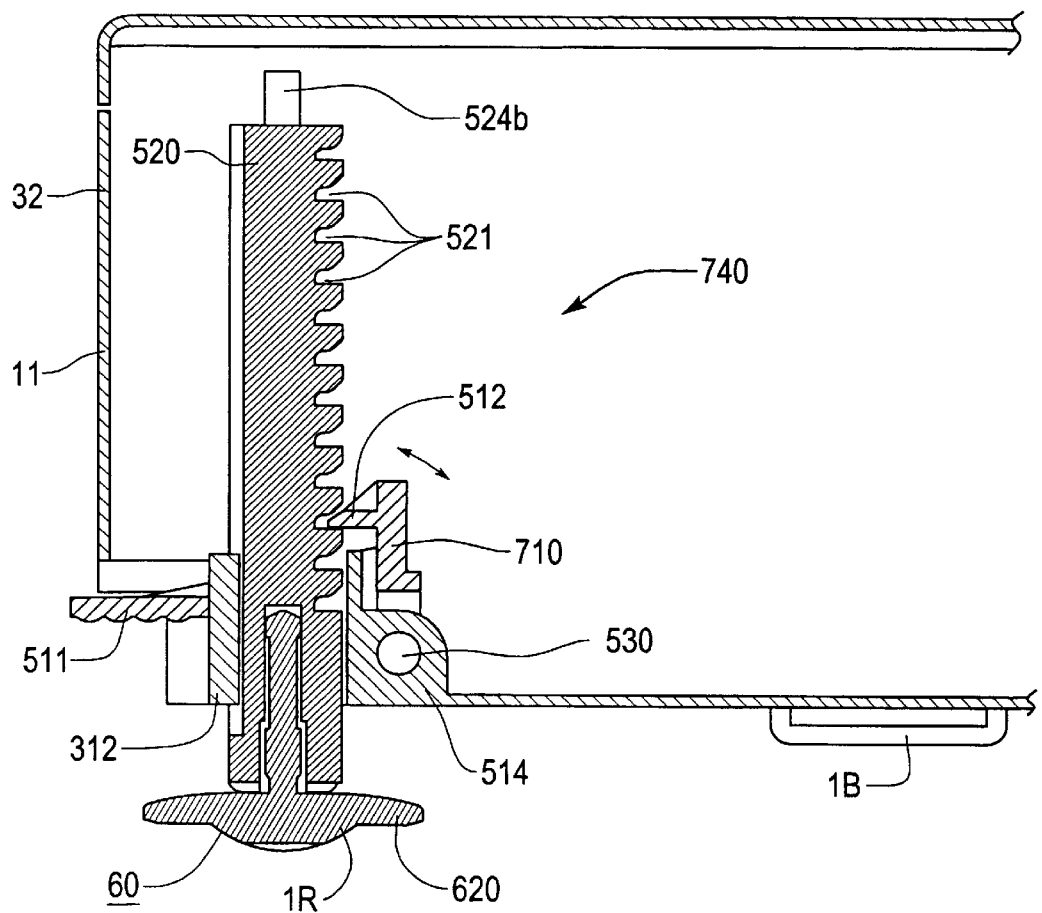
FIG. 17 is a vertical sectional view showing the fixed state of a foot section of an adjustment mechanism in a projector according to a fourth embodiment of the present invention.
Figure 18:
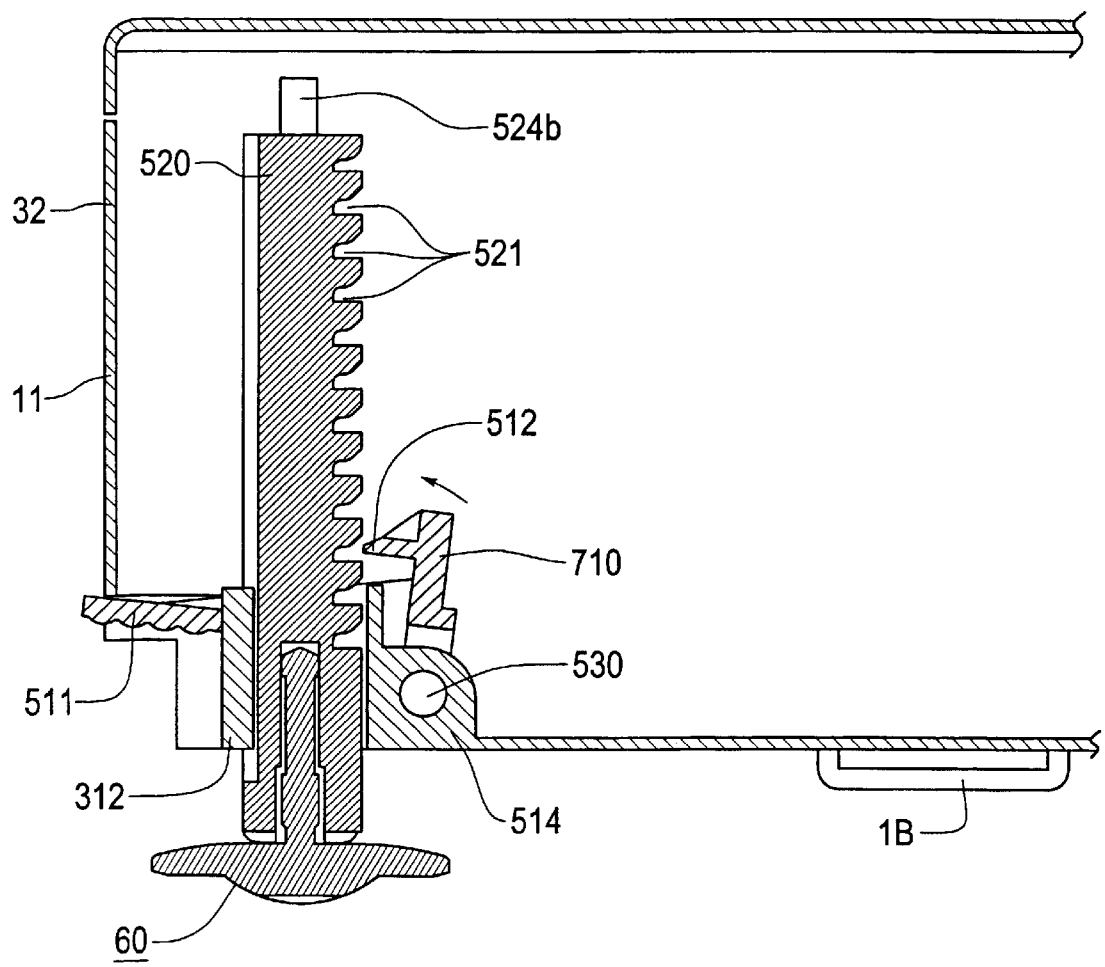
FIG. 18 is a vertical sectional view showing the released state of the foot section of the adjustment mechanism in the projector according to the above embodiment.

An adjustment mechanism 740 of the fourth embodiment is different from the above ones in that a retaining piece 512 and a recess 521 are kept engaged by being urged by the weight of a retainer 710, as shown in FIGS. 17 and 18.

That is, the retaining piece 512 is urged counterclockwise about a shaft pin 530 by the weight of the retainer 710, as shown in FIG. 17, and the engagement between the retaining piece 512 and the recess 521 is thereby maintained.

When a control portion 511 is operated with the finger, the retaining piece 512 turns clockwise, and disengages from the recess 521, as shown in FIG. 18.

Since other components are the same as those in the first embodiment, common components are denoted by the same numerals as those used in FIGS. 8 to 11, and a detailed description thereof is omitted.

Such a projector according to the fourth embodiment has the following advantages besides the aforesaid advantages of the first to third embodiments.

That is, since the engaged retaining piece 512 and recess 521 are urged by the weight of the retainer 710, there is no need for a special urging member such as a coil spring, which makes it possible to simplify the structure of the adjustment mechanism 740, and to thereby reduce the manufacturing and parts costs of the projector.

Next, a projector according to a fifth embodiment will be described.

Figure 19A:
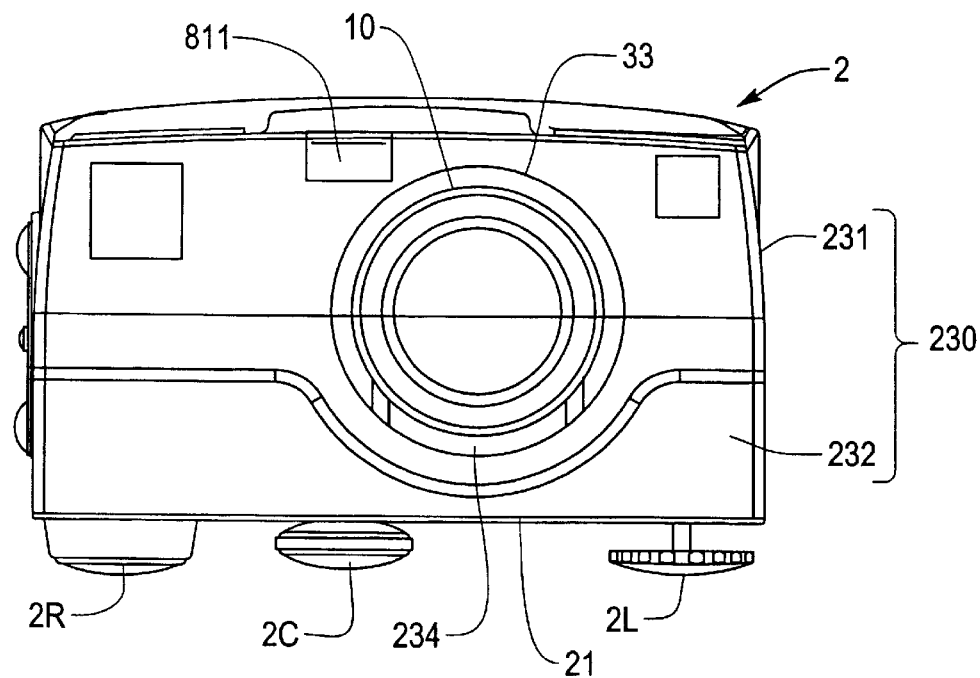
FIGS. 19(A) and 19(B) are front and rear elevations of a projector according to a fifth embodiment of the present invention.
Figure 19B:
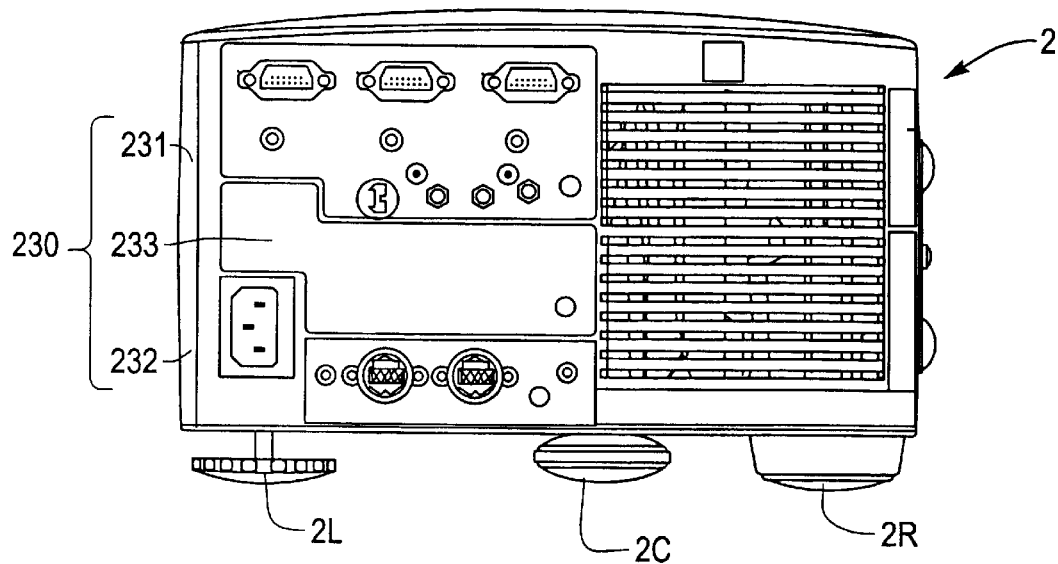
Figure 20A:
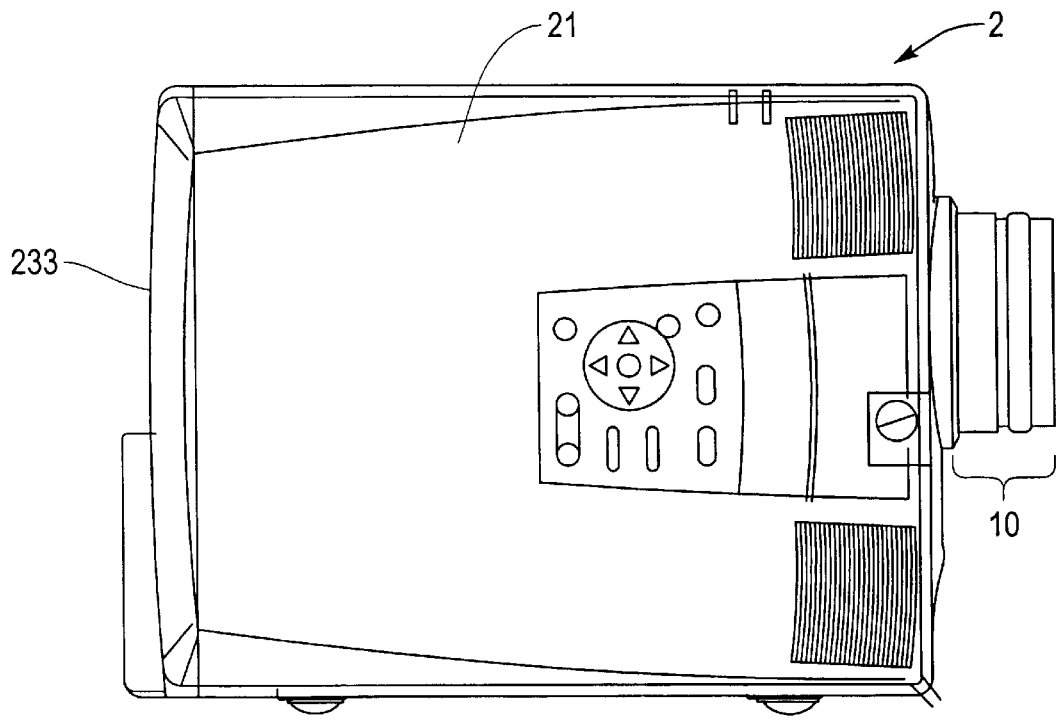
FIGS. 20(A) and 20(B) are top and bottom views of the projector according to the above embodiment.
Figure 20B:
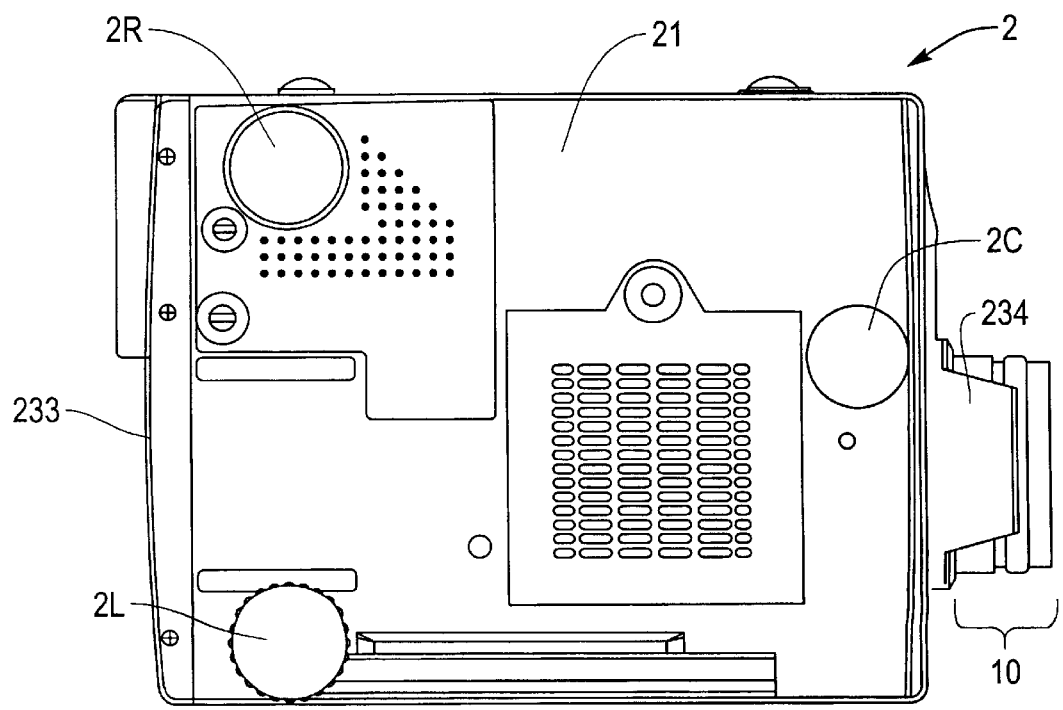

FIGS. 19 and 20 show a projector 2 according to the fifth embodiment. FIGS. 19(A) and 19(B) are respectively front and rear elevations, and FIGS. 20(A) and 20(B) are respectively top and bottom plan views.

The projector 2 has an outer casing 230 including an upper casing 231, a lower casing 232, a rear casing 233, and a guard section 234.

The outer casing 230 is provided with an opening 33 at the center front thereof. A projection lens 10 protrudes from the opening 33, and projects an image onto a projection plane.

The difference from the aforesaid projector 1 of the first embodiment is in the arrangement of feet protruding from the base of a main body 21, as shown in FIG. 20(B). That is, the main body 21 is provided with feet 2R and 2L at the rear right and left ends thereof, and a foot 2C at about the front center corresponding to the position of the center of gravity thereof.

The amount of protrusion of the foot 2C can be freely set by the use of an adjuster 850 (described later) located inside the main body, and the setting operation is mainly performed by pressing a control section 811 shown in FIG. 19(A).

The foot 2L is a screw member in threaded engagement with a screw receiving portion (not shown) formed inside the main body. Therefore, the horizontal orientation of the projector 2 can be adjusted by turning the foot 2L and changing the amount of protrusion of the foot 2L.

Since the method of adjusting the length of the foot 2L is almost the same as in the structure of the second adjustment means 60 according to the first embodiment, a description thereof is omitted.

The amount of protrusion of the foot 2C from the main body 21 is adjusted by the adjuster 850 shown in FIG. 21.

That is, a foot section 820 for constituting the foot 2C is a rod-like member supported slidably along the protrusion direction with respect to the main body 21, and the adjustment means 850 is located inside the main body 21 to fix the sliding of the foot section 820 at an arbitrary position.

The foot section 820 includes a shaft portion 821 shaped like a cylindrical rod, and a ground portion 822 formed at the leading end of the shaft portion 821 in the protrusion direction and serving as a ground plane to be in contact with a desk or the like.

Figures 21A, 21B:
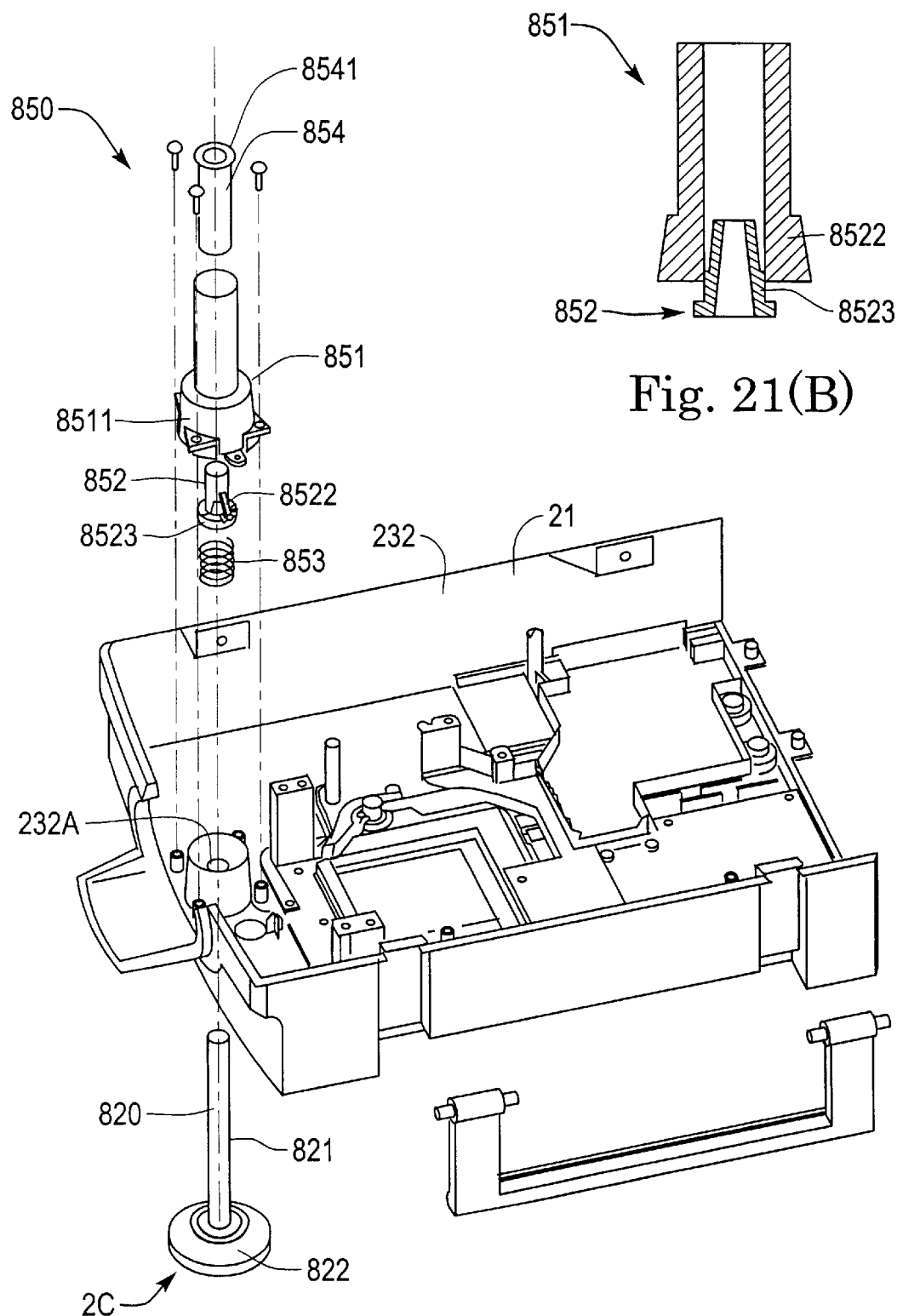
FIG. 21(A) and 21(B) an exploded perspective view showing the structure of an adjuster in the above embodiment and a sectional view of a portion of the adjuster.

On the other hand, the adjuster 850 includes, as shown in FIG. 21(A), a cylindrical foot case 851, a ring-shaped foot holder 852, a coil spring 853 for urging the engagement between the foot case 851 and the foot holder 852, and a release member 854 for releasing the urging by the coil spring 853.

The lower casing 232 is provided with a hole 232A through which the shaft portion 821 of the foot 2C is inserted. In incorporating the foot 2C and the adjuster 850 in the main body 21, the shaft portion 821 is first projected upward from the hole 232A, and then the coil spring 853, the foot holder 852, the foot case 851, and the release member 854 are put thereon in order. Finally, a flange portion 8511 formed at the lower end of the foot case 851 is screwed on the lower casing 232 at four points.

The outer surface of the foot holder 852 is tapered so that the diameter decreases toward the upper end thereof, and is provided with three grooves 8522 extending upward from the lower end in a part thereof. The diameter can be decreased by these grooves 8522 to some extent.

The foot holder 852 is also provided, on the outer surface, with three ribs 8523 extending upward from the lower end thereof. Therefore, as shown in FIG. 21(B), the foot case 851 and the foot holder 852 are engaged in almost point contact with each other.

Figure 22:
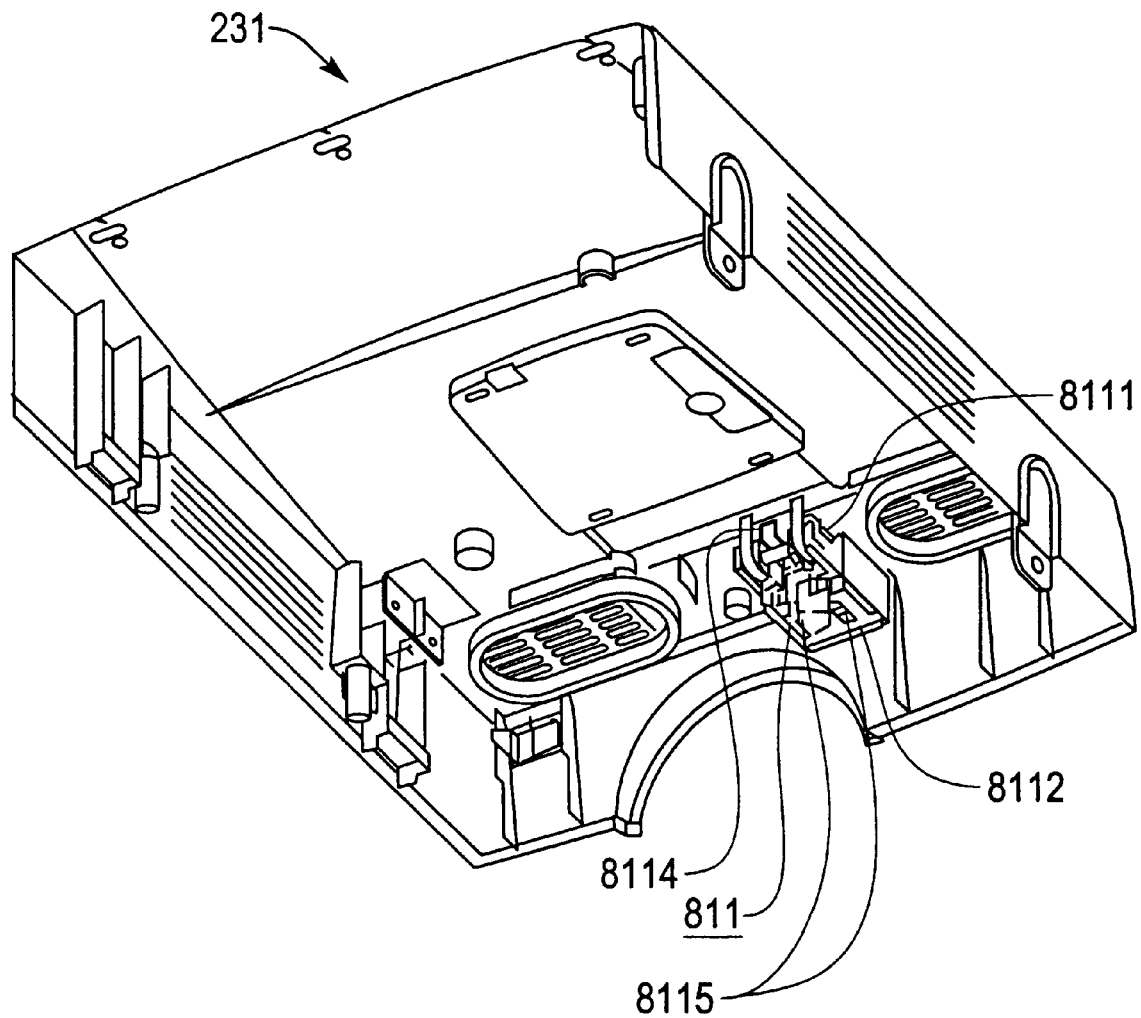
FIG. 22 is a schematic perspective view showing the structure of a control section in the above embodiment.
Figure 23:
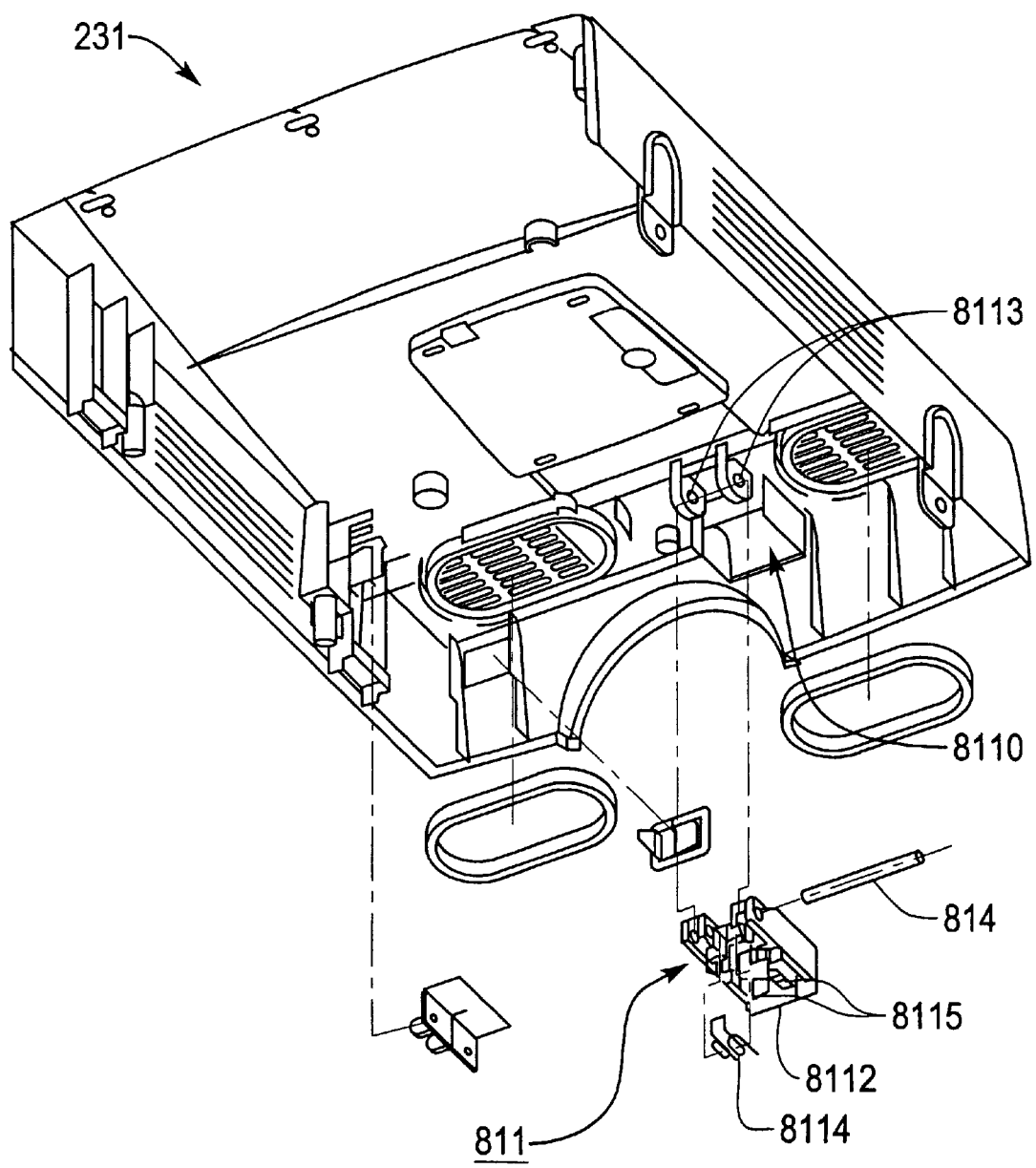
FIG. 23 is an exploded perspective view showing the structure of the control section in the above embodiment.

FIGS. 22 and 23 are views showing the structure of the control section. As shown in these figures, the control section 811 includes a foot control button 8112, and a foot control button insertion portion 8110 formed on the upper casing 231.

The control button 8112 is mounted in the foot control button insertion portion 8110 via a turn shaft 8111 and a fixed spring 8114. The foot control button insertion portion 8110 is provided with a support section 8113 for turnably supporting the foot control button 811 via the turn shaft 8111.

When the foot control button 8112 is mounted in the foot control button insertion portion 8110, it is pushed up by the fixed spring 8114.

The foot control button 8112 has, on the lower surface thereof, two contact plates 8115 for pushing down the aforesaid release member 854 when it is pressed down.

When the foot 2C and the adjuster 850 are incorporated in the main body 21, the foot holder 852 is urged by the weight of the projector body via the coil spring 853, so that it is pushed into the foot case 851, and the diameter thereof is decreased. The foot holder 852, whose diameter is decreased, is pushed into the foot case 851 while gripping the foot section 820 inside thereof, and the foot section 820 is thereby fixed.

On the other hand, the upper end of the release member 854 is protruding from the upper end of the foot case 851, and the lower end thereof is in contact with the upper end surface of the foot holder 852. As a result, when the release member 854 is pushed down by pressing an upper end surface 8541 thereof, the foot holder 852 shown in FIG. 21(A) is pushed downward out of the foot case 851 against the coil spring 853. In this state, the foot holder 852 increases in diameter, and therefore, the foot section 820 is freed from the grip state and allowed to be pulled out from the foot case 851 by an arbitrary length. Since the foot section 820 falls by its own weight, it is not required to be pulled out by hand.

The operation of pushing down the release member 854 is performed through the foot control button 8112. That is, when the upper casing 231 is put on the lower casing 232 after the components, such as the foot control button 8112 and the foot case 851, are mounted on the upper casing 231 and the lower casing 232, the contact plates 8115 of the foot control button 8112 naturally make contact with the flange-shaped upper end surface 8541 of the release member 854. When the foot control button 8112 is pressed down, the release member 854 is pushed down by the contact plates 8115.

In this way, the foot holder 852 and the shaft portion 820 are disengaged by using the foot control button 8112 with the finger, that is, by pressing the foot control button 8112 when raising the front end of the projector 2, so that the foot section 820 is automatically pulled out. Then, the finger is taken away from the foot control button 8112 at the position where the length of the foot section is determined, whereby the shaft portion 820 is gripped again by the foot holder 852, and the foot section 820 is fixed.

In vertical adjustment, if a projection lens unit 10 is touched with the hand, there is a fear that the optical axis thereof will be tilted. Therefore, it is preferable to put the hand on the guard section 234 located thereunder.

The above-mentioned adjuster 850 of the projector 2 according to the fifth embodiment has almost the same advantages as those of the aforesaid adjustment mechanism 40 of the first embodiment, and also has the following advantages.

Since the projector 2 has the adjuster 850 that can fix the protrusion of the foot section 820 at an arbitrary position, the position of the main body 21 of the projector 2 in the vertical direction (the direction of projection from the projection lens unit 10) can be arbitrarily adjusted with one hand.

Furthermore, since the amount of protrusion of the foot section 820 from the main body 21 can be arbitrarily set only by the adjuster 850, there is no need to make adjustment in two steps as in the adjustment mechanisms 40, 640, and 740 of the first to fourth embodiments, which further simplifies the adjustment procedure.

The present invention is not limited to the above-mentioned first to fifth embodiments, and also includes at least the following modifications.

That is, while only the feet 1R and 1L are adjustable in the aforesaid projector 1 of the first embodiment, the foot 1B may be also adjustable.

If the foot 1B also has an adjustment mechanism, not only the projection angle θ but also the total height of the main body 11 of the projector 1 can be adjusted, which avoids a phenomenon in which the image is excessively distorted because a projection angle θ is too large.

Still furthermore, the positions where adjustment is to be made are not limited to the feet 1R and 1L, the number of feet of the projector 1 is not limited to three, and they may be appropriately determined depending on the weight, size and the like of the projector.

In addition, while the first and second adjuster 50 and 60 are provided for the feet 1R and 1L each in the aforesaid projector 1 of the first embodiment, they may be located at separate positions so that stepwise adjustment and fine adjustment are made by adjusters of different feet.

While the aforesaid adjustment mechanisms of the first to fifth embodiments are provided in the projection-type projectors 1 and 2, they may also be applicable to all types of projectors for projecting an image onto a projection plane, such as an overhead projector and a data projector.

In addition, the specific structure, shape and the like in the embodiments of the present invention may be changed within the scope in which the object of the present invention is achieved.

As mentioned above, according to the projector of the present invention, since a foot is supported slidably with respect to a main body and an adjuster is provided to fix the foot at an arbitrary position, it is possible to easily and speedily adjust the position of a projection image of the projector.

The present invention can be utilized to form an optical image corresponding to image information by optically processing a light beam emitted from a light source, and to project the magnified optical image onto a projection plane.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A projector, comprising:
   a main body having a base and a side;
   a plurality of feet that support the main body, each foot of the plurality of feet protruding in a protruding direction from the main body;
   a first adjuster that adjusts stepwise a distance of protrusion of at least one foot of the plurality of feet; and
   a second adjuster that variably adjusts the distance of protrusion of at least one foot of the plurality of feet.

2. The projector according to claim 1, wherein the adjustment by said first adjuster is made by operating a lever.

3. The projector according to claim 2, wherein a direction of operation of said lever is parallel to a raising direction of said main body.

4. The projector according to claim 2, wherein said lever is located in a cutout portion formed on a boundary between the base and the side of said main body, and at least one portion of said lever protrudes from the side of said main body.

5. The projector according to claim 1, wherein the first adjuster includes a plurality of adjusters located at substantially symmetrical positions with respect to a center of gravity of said main body.

6. A projector, comprising:
   a main body having a retainer;
   a plurality of feet that support the main body, each foot of the plurality of feet protruding from the main body, at least one foot of the plurality of feet including a rod-like member slidably supported by the main body in a protruding direction with respect to said main body;
   a first adjuster on an outer peripheral surface of said at least one foot of the plurality of feet and defining a plurality of recesses, the first adjuster adjusting stepwise a distance of protrusion of said at least one foot of the plurality of feet by selective engagement of the retainer and one of the plurality of recesses; and
   a second adjuster on said at least one foot of the plurality of feet, the second adjuster variably adjusting the distance of protrusion.

7. The projector according to claim 6, wherein said main body is provided with a lever for engaging and disengaging said retainer and said one of the plurality of recesses.

8. The projector according to claim 7, wherein said retainer includes a retaining piece engaged with said one of the plurality of recesses and rotatably supported in said main body by a shaft pin, an urging member that maintains engagement of said one of the plurality of recesses and said retaining piece, and a control portion for disengaging said one of the plurality of recesses and said retaining piece through the operation of said lever.

9. The projector according to claim 6, further comprising a first regulator that prevents said at least one foot of the plurality of feet from separating from said main body.

10. The projector according to claim 9, wherein said first regulator is located on said at least one foot of the plurality of feet.

11. The projector according to claim 6, wherein said second adjuster is located in said at least one foot of the plurality of feet and includes a screw receiving portion having a thread groove formed along the protruding direction of said at least one foot of the plurality of feet, and a screw member having a thread portion in threaded engagement with said thread groove.

12. The projector according to claim 11, further comprising a second regulator that prevents said screw member from separating from said at least one foot of the plurality of feet.

13. The projector according to claim 11, said screw member further comprising a control portion for turning said screw member with respect to said at least one foot of the plurality of feet, said control portion including a disk member larger than a cross section of said at least one foot of the plurality of feet, and said disk member having a plurality of protrusions on an outer periphery thereof.

14. The projector according to claim 12, wherein said thread groove formed in said screw receiving portion is a female thread groove formed on an inner surface of a hole extending from a base end of said at least one foot of the plurality of feet along the protruding direction,
   said screw member is a rod-like member with a leading end inserted into said screw receiving portion and has an adjustment portion on its outer peripheral surface, the adjustment portion being a male thread portion and being threadedly engaged with said screw receiving portion, and a guide portion adjacent the adjustment portion, closer to the leading end than the adjustment portion, and not threadedly engageable with said screw receiving portion, said second regulator includes an insertion portion in the hole and adjacent the screw receiving portion such that the screw receiving portion is between the insertion portion and the base end, the insertion portion having a diameter slightly larger than a root diameter of the female thread groove of the screw receiving portion, the guide portion on said screw member, and a regulating portion on the leading end side of the guide portion and threadedly engageable with said adjustment portion.

15. The projector according to claim 8, further comprising a first regulator that prevents said at least one foot of the plurality of feet from separating from said main body.

16. The projector according to claim 10, wherein said second adjuster is located in said at least one foot of the plurality of feet and includes a screw receiving portion having a thread groove formed along the protruding direction of said at least one foot of the plurality of feet, and a screw member having a thread portion in threaded engagement with said thread groove.

17. The projector according to claim 16, further comprising a second regulator that prevents said screw member from separating from said at least one foot of the plurality of feet.

18. The projector according to claim 17, wherein said thread groove formed in said screw receiving portion is a female thread groove formed on an inner surface of a hole extending from a base end of said at least one foot of the plurality of feet along the protruding direction, said screw member is a rod-like member with a leading end inserted into said screw receiving portion and has an adjustment portion on its outer peripheral surface, the adjustment portion being a male thread portion and being threadedly engaged with said screw receiving portion, and a guide portion adjacent the adjustment portion, closer to the leading end than the adjustment portion, and not threadedly engageable with said screw receiving portion, said second regulator includes an insertion portion in the hole and adjacent the screw receiving portion such that the screw receiving portion is between the insertion portion and the base end, the insertion portion having a diameter slightly larger than a root diameter of the female thread groove of the screw receiving portion, the guide portion on said screw member, and a regulating portion on the leading end side of the guide portion and threadedly engageable with said adjustment portion.

19. The projector according to claim 18, said screw member further comprising a control portion for turning said screw member with respect to said at least one foot of the plurality of feet, said control portion including a disk member larger than a cross section of said at least one foot of the plurality of feet, and said disk member having a plurality of protrusions on an outer periphery thereof.

20. The projector according to claim 1, the second adjuster adjusting the distance of protrusion more finely than the first adjuster.

21. The projector according to claim 6, the second adjuster adjusting the distance of protrusion more finely than the first adjuster.

22. A method of adjusting a position of a projector having a plurality of feet that support the projector, the method comprising the steps of:

adjusting stepwise a distance of protrusion of at least one foot of the plurality of feet with a first adjuster; and adjusting variably the distance of protrusion of at least one foot of the plurality of feet with a second adjuster.

23. The method according to claim 22, the second adjuster adjusting the distance of protrusion more finely than the first adjuster.

24. A method of adjusting the position of a projector having a main body, a plurality of feet that support the main body and a retainer, at least one foot of the plurality of feet including a rod-like member slidably supported in a protruding direction with respect to said main body, the method comprising the steps of:

adjusting stepwise a distance of protrusion of the at least one foot of the plurality of feet with a first adjuster defining a plurality of recesses on an outer peripheral surface of the at least one foot of the plurality of feet, by selective engagement of the retainer and one of the plurality of recesses; and adjusting variably the distance of protrusion with a second adjuster on the at least one foot of the plurality of feet.

25. The method according to claim 24, second adjuster adjusting the distance of protrusion more finely than the first adjuster.

26. The method according to claim 24, comprising the step of adjusting variably the distance of protrusion with the second adjuster by rotating a control portion that is threadedly engaged with the at least one foot of the plurality of feet.

27. A projector comprising:

a main body, and a plurality of feet protruding in a protruding direction from said main body to support said main body, wherein at least one of said plurality of feet includes a shaft portion shaped like a rod, the shaft portion is supported slidably with respect to said main body along the protruding direction and said main body is provided with an adjuster fixing said shaft portion at a variably adjustable position, said adjuster including:

a cylindrical foot case covering said shaft portion;

a ring-shaped foot holder in a lower end of the cylindrical foot case, having a tapered portion, and gripping said shaft portion inside the cylindrical foot case, the tapered portion decreasing in diameter in an insertion direction of said shaft portion into said main body;

an urging member that urges said ring-shaped foot holder in the insertion direction; and a release member that releases the grip of said ring-shaped foot holder on said shaft portion.

* * * * *